United States Patent
Tucker et al.

(10) Patent No.: US 10,657,735 B2
(45) Date of Patent: May 19, 2020

(54) SYSTEM AND METHOD FOR ADAPTABLE TREND DETECTION FOR COMPONENT CONDITION INDICATOR DATA

(71) Applicant: Textron Innovations Inc., Providence, RI (US)

(72) Inventors: Brian Edward Tucker, Fort Worth, TX (US); Matthew Curtis Ledbetter, North Richland Hills, TX (US)

(73) Assignee: TEXTRON INNOVATIONS INC., Providence, RI (US)

( * ) Notice: Subject to any disclaimer, the term of this patent is extended or adjusted under 35 U.S.C. 154(b) by 331 days.

(21) Appl. No.: 15/728,159

(22) Filed: Oct. 9, 2017

(65) Prior Publication Data

US 2019/0108691 A1    Apr. 11, 2019

(51) Int. Cl.
*G07C 5/00* (2006.01)
*B64D 45/00* (2006.01)
(Continued)

(52) U.S. Cl.
CPC .......... *G07C 5/006* (2013.01); *B64D 45/00* (2013.01); *B64F 5/60* (2017.01); *G05B 23/0232* (2013.01);
(Continued)

(58) Field of Classification Search
CPC ...... G07C 5/006; G07C 5/008; G07C 5/0808; G07C 5/0816; G05B 23/0232;
(Continued)

(56) References Cited

U.S. PATENT DOCUMENTS 7,430,483 B2    9/2008  Wiig
7,620,533 B2    11/2009 Bolt et al.
(Continued)

FOREIGN PATENT DOCUMENTS

EP    0843244 A1    5/1998
EP    1612458 A2    1/2016
(Continued)

OTHER PUBLICATIONS

Appel, G. et al., "Technical Analysis Power Tools for Active Investors," 2005 Pearson Education, Inc., Publishing as Financial Times Prentice Hall, Mar. 2005, 265 pages.
(Continued)

*Primary Examiner* — Mary Cheung
(74) *Attorney, Agent, or Firm* — Slater Matsil, LLP

(57) ABSTRACT

A system for adaptable trend detection for component condition indicator data includes a sensor operable to measure an operating condition of a vehicle and generate a sensor signal associated with the operating condition and a data server operable to acquire a current condition indicator of a condition indicator set according to the sensor signal, and to determine whether a trend in the condition indicator set is indicated according to at least the current condition indicator, at least one previous condition indicator of the condition indicator set and a volatility of at least a portion of the condition indicator set. The data server is further operable to provide an alert in response to determining that the trend is indicated.

20 Claims, 15 Drawing Sheets

(51) Int. Cl.
*B64F 5/60* (2017.01)
*G07C 5/08* (2006.01)
*G05B 23/02* (2006.01)

(52) U.S. Cl.
CPC .......... *G07C 5/008* (2013.01); *G07C 5/0808* (2013.01); *B64D 2045/0085* (2013.01); *G05B 2219/34477* (2013.01)

(58) Field of Classification Search
CPC .......... G05B 2219/34477; B64D 45/00; B64D 2045/0085; B64F 5/60
See application file for complete search history.

(56) References Cited

U.S. PATENT DOCUMENTS

| | | | |
|---|---|---|---|
| 8,725,677 B1 | 5/2014 | Engler et al. | |
| 9,701,420 B1 | 7/2017 | Tucker | |
| 2004/0111357 A1* | 6/2004 | Downs, II | G06Q 40/00 705/37 |
| 2004/0176926 A1* | 9/2004 | Edie | B23Q 17/0971 702/179 |
| 2008/0016009 A1* | 1/2008 | Hjartberg | G06Q 40/00 705/36 R |
| 2009/0156126 A1* | 6/2009 | Willis | G01S 5/0226 455/41.3 |
| 2017/0011560 A1 | 1/2017 | Sheldon et al. | |

FOREIGN PATENT DOCUMENTS

| | | |
|---|---|---|
| WO | 2004059399 A2 | 7/2004 |
| WO | 2015153845 A1 | 10/2015 |

OTHER PUBLICATIONS

Appel, G. et al., "Understanding MACD (Moving Average Convergence/Divergence)," Traders Press, Inc., 2007, Reprinted Jan. 2008, 58 pages.
Appel, G., "The Moving Average Convergence Divergence Method," Great Neck, NY, Signalert, 1979. (See attached).
Bollinger, J., "Bollinger on Bollinger Bands," New York, NY,. McGraw Hill, 2002, 132 pages.
Gandolfi, G. et al., "Dynamic MACD: Standard Deviation Embedded in MACD Indicator for Accurate Adjustment to Financial Market Dynamics," IFTA Journal, 2008, 6 pages.
Krick, S. et al., "Evaluation of a Novel Dynamic Thresholding and Trend Alert Generation Technology on a HUMS-Equipped Fleet," American Helicopter Society 68th Annual Forum, Fort Worth, TX, May 1-3, 2012, 6 pages.

* cited by examiner

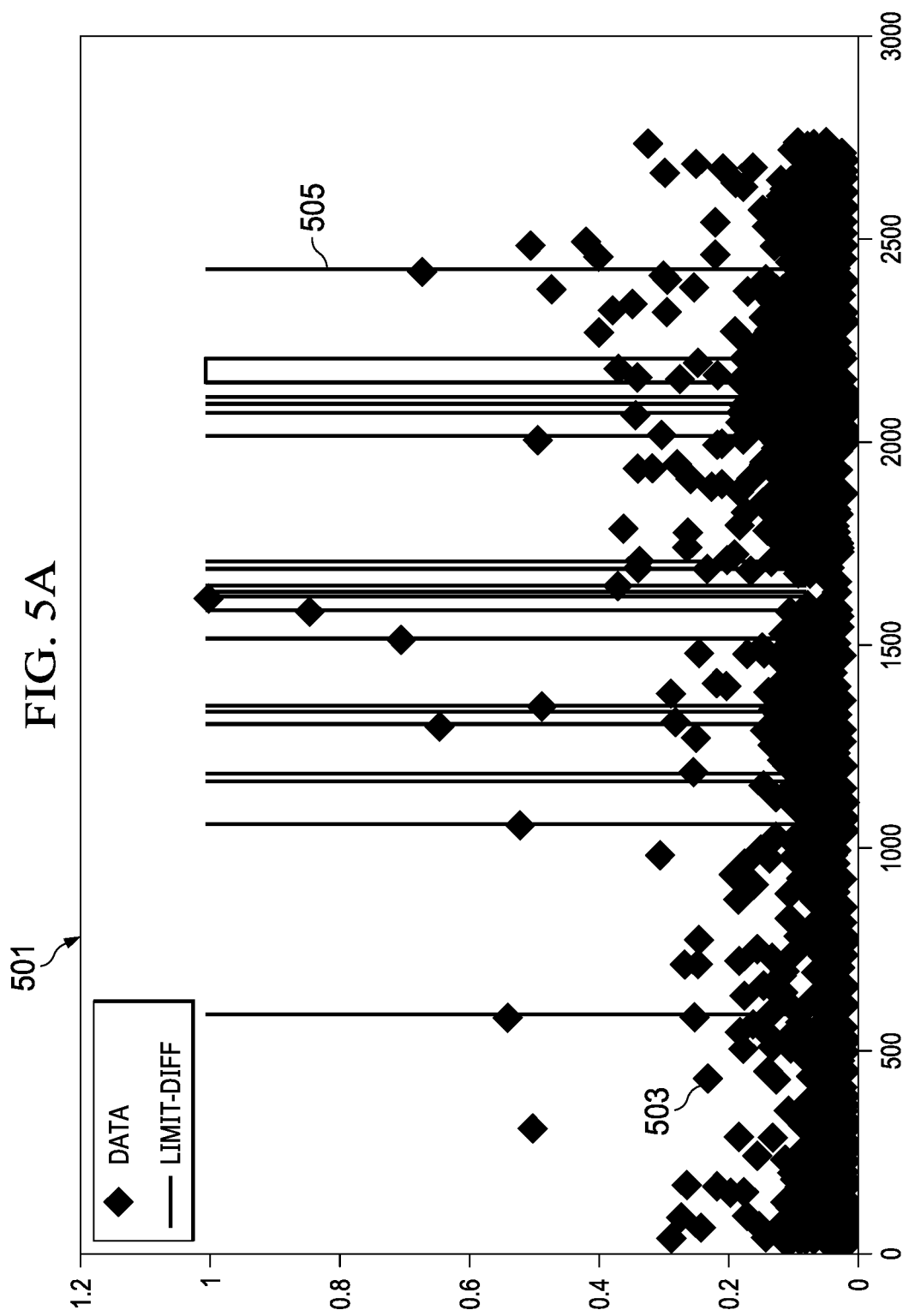

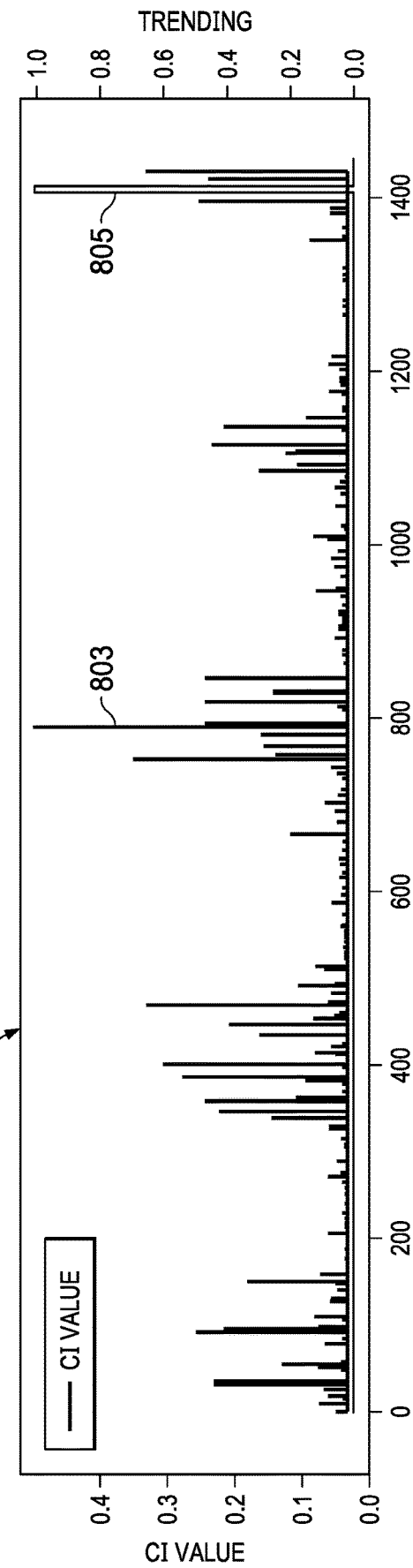
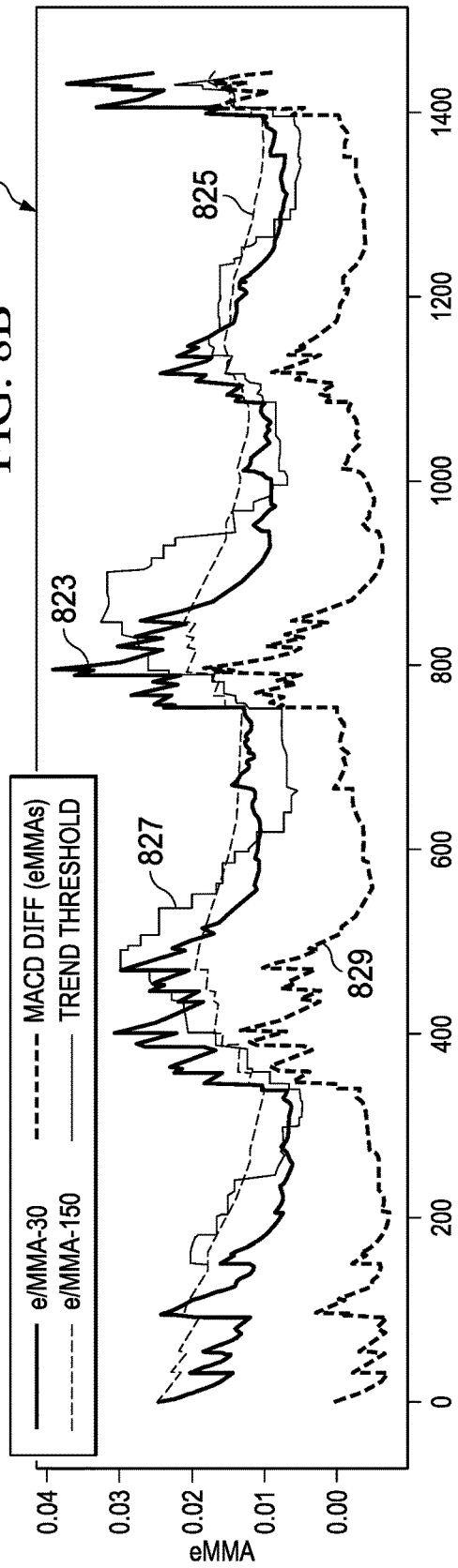

SYSTEM AND METHOD FOR ADAPTABLE TREND DETECTION FOR COMPONENT CONDITION INDICATOR DATA

TECHNICAL FIELD

The present invention relates generally to a system and method for system degradation or failure and maintenance analysis, and, in particular embodiments, to a system and method for detecting trends in condition indicators for vehicles.

BACKGROUND

A rotorcraft may include one or more rotor systems including one or more main rotor systems. A main rotor system generates aerodynamic lift to support the weight of the rotorcraft in flight and thrust to move the rotorcraft in forward flight. Another example of a rotorcraft rotor system is a tail rotor system. A tail rotor system may generate thrust in the same direction as the main rotor system's rotation to counter the torque effect created by the main rotor system. For smooth and efficient flight in a rotorcraft, a pilot balances the engine power, main rotor collective thrust, main rotor cyclic thrust and the tail rotor thrust, and a control system may assist the pilot in stabilizing the rotorcraft and reducing pilot workload. The systems for engines, transmissions, drive system, rotors, and the like, are critical to the safe operation of the rotorcraft in flight. The elements of system such as mechanical systems, electrical systems, hydraulic systems, and the like, are each subject to unique wear factors and monitoring, inspection or maintenance requirements.

SUMMARY

An embodiment system includes a sensor operable to measure an operating condition of a vehicle and generate a sensor signal associated with the operating condition and a data server operable to acquire a current condition indicator of a condition indicator set according to the sensor signal, and to determine whether a trend in the condition indicator set is indicated according to at least the current condition indicator, at least one previous condition indicator of the condition indicator set and a volatility of at least a portion of the condition indicator set. The data server is further operable to provide an alert in response to determining that the trend is indicated.

An embodiment data server includes a processor and a non-transitory computer-readable storage medium storing a program to be executed by the processor. The program including instructions for acquiring a current condition indicator of a condition indicator set associated with an operating condition of a vehicle, with the condition indicator set indicating sensor readings associated with an operating element of the vehicle under the operating condition, and determining a volatility of a first portion of the condition indicator set, where the first portion of the condition indicator set includes the current condition indicator. The program further includes instructions for determining one or more moving averages of a second portion of the condition indicator set, determining whether a trend associated with the operating element is indicated according to the one or more moving averages and the volatility, and generating an alert signal in response to the determining that the trend is indicated.

An embodiment method includes acquiring a current condition indicator of a condition indicator set associated with an operating condition of a vehicle, with the condition indicator set indicating sensor readings associated with an operating element of the vehicle under the operating condition, determining, by a data server, a volatility of a first portion of the condition indicator set, where the first portion of the condition indicator set includes the current condition indicator, determining, by the data server, one or more moving averages of a second portion of the condition indicator set, determining, by the data server, whether a trend associated with the operating element is indicated according to the one or more moving averages and the volatility, and generating, by the data server, an alert signal in response to the determining that the trend is indicated.

BRIEF DESCRIPTION OF THE DRAWINGS

For a more complete understanding of the present invention, and the advantages thereof, reference is now made to the following descriptions taken in conjunction with the accompanying drawings, in which:

FIG. 5A is a graph illustrating a trend indication using the static trend threshold 407 with noisy condition indicator data according to some embodiments;

FIG. 8A is a graph illustrating condition indicator data and a trend indication according to some embodiments;

FIG. 8B is a graph illustrating the calculation of EMA values and adaptable trend threshold according to some embodiments;

DETAILED DESCRIPTION OF ILLUSTRATIVE EMBODIMENTS

Figure 1:
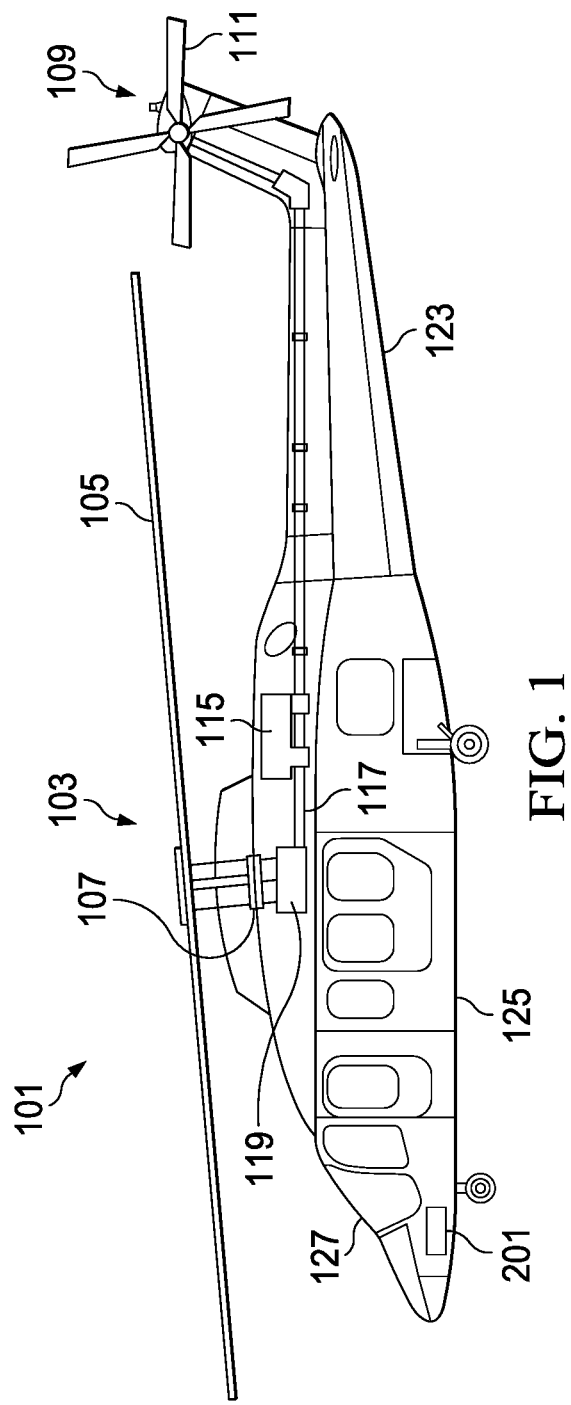
FIG. 1 illustrates a rotorcraft according to some embodiments.

Illustrative embodiments of the system and method of the present disclosure are described below. In the interest of clarity, all features of an actual implementation may not be described in this specification. It will of course be appreciated that in the development of any such actual embodiment, numerous implementation-specific decisions may be made to achieve the developer's specific goals, such as compliance with system-related and business-related constraints, which will vary from one implementation to another. Moreover, it should be appreciated that such a development effort might be complex and time-consuming but would nevertheless be a routine undertaking for those of ordinary skill in the art having the benefit of this disclosure.

Reference may be made herein to the spatial relationships between various components and to the spatial orientation of various aspects of components as the devices are depicted in the attached drawings. However, as will be recognized by those skilled in the art after a complete reading of the present disclosure, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The increasing use of rotorcraft, in particular, for commercial and industrial applications, has led to the development of larger more complex rotorcraft. However, as rotorcraft become larger and more complex, the differences between flying rotorcraft and fixed wing aircraft has become more pronounced. Since rotorcraft use one or more main rotors to simultaneously provide lift, control attitude, control altitude, and provide lateral or positional movement, different flight parameters and controls are tightly coupled to each other, as the aerodynamic characteristics of the main rotors affect each control and movement axis. For example, the flight characteristics of a rotorcraft at cruising speed or high speed may be significantly different than the flight characteristics at hover or at relatively low speeds. Additionally, different flight control inputs for different axes on the main rotor, such as cyclic inputs or collective inputs, affect other flight controls or flight characteristics of the rotorcraft. For example, pitching the nose of a rotorcraft forward to increase forward speed will generally cause the rotorcraft to lose altitude. In such a situation, the collective may be increased to maintain level flight, but the increase in collective requires increased power at the main rotor which, in turn, requires additional anti-torque force from the tail rotor. This is in contrast to fixed wing systems where the control inputs are less closely tied to each other and flight characteristics in different speed regimes are more closely related to each other.

Recently, fly-by-wire (FBW) systems have been introduced in rotorcraft to assist pilots in stably flying the rotorcraft and to reduce workload on the pilots. The FBW system may provide different control characteristics or responses for cyclic, pedal or collective control input in the different flight regimes, and may provide stability assistance or enhancement by decoupling physical flight characteristics so that a pilot is relieved from needing to compensate for some flight commands issued to the rotorcraft. FBW systems may be implemented in one or more flight control computers (FCCs) disposed between the pilot controls and flight control systems, providing corrections to flight controls that assist in operating the rotorcraft more efficiently or that put the rotorcraft into a stable flight mode while still allowing the pilot to override the FBW control inputs. The FBW systems in a rotorcraft may, for example, automatically adjust power output by the engine to match a collective control input, apply collective or power correction during a cyclic control input, provide automation of one or more flight control procedures provide for default or suggested control positioning, or the like.

Embodiments of the system presented herein are directed to providing a system for measuring operating conditions in a vehicle, and determining trends of the operating conditions in order to provide condition alerts to operators and technicians. In some embodiments, a reporting system receives signals from one or more sensors, and determines condition indicators that may indicate the magnitude or other properties of conditions such as vibration or the like. The system analyzes a series of condition indicators associated with a particular operating element to determine trends in the condition indicators. The trends may be used to determine that the condition indicators for a particular operating element has changed due to, for example, wear, damage, or the like. For example, vibration associated with a fuel pump, transmission gear, engine turbine, or the like, may be tracked, and trends associated with a change outside of a trend threshold may indicate that the operating element may need inspection, repair or replacement.

In some embodiments, the system may use a moving average of condition indicators, such as an exponential moving average (EMA), to determine trends for the associated operating element. In some embodiments, moving average convergence divergence (MACD) analysis may be used to determine the trends, and in some embodiments, the MACD may be a difference between a short term EMA and a longer term EMA. The MACD may be compared to a static trend threshold, or to an adaptable trend threshold based on one or more of the data or condition indicators, the volatility of the condition indicators, the static trend threshold, or the like, and the comparison may indicate the trend. When a trend is detected, the system may provide an alert through, for example, an indicator in the vehicle, through a report, through a web interface accessible through a server, through an automated message, or the like.

FIG. 1 illustrates a rotorcraft 101 according to some embodiments. The rotorcraft 101 has a main rotor system 103, which includes a plurality of main rotor blades 105. The pitch of each main rotor blade 105 may be controlled by a swashplate 107 in order to selectively control the attitude, altitude and movement of the rotorcraft 101. The swashplate 107 may be used to collectively and/or cyclically change the pitch of the main rotor blades 105. The rotorcraft 101 also has an anti-torque system, which may include a tail rotor 109, no-tail-rotor (NOTAR), or dual main rotor system. In rotorcraft with a tail rotor 109, the pitch of each tail rotor blade 111 is collectively changed in order to vary thrust of the anti-torque system, providing directional control of the rotorcraft 101. The pitch of the tail rotor blades 111 is changed by one or more tail rotor actuators. In some embodiments, the FBW system sends electrical signals to the tail rotor actuators or main rotor actuators to control flight of the rotorcraft.

Power is supplied to the main rotor system 103 and the anti-torque system by engines 115. There may be one or more engines 115, which may be controlled according to signals from the FBW system. The output of the engine 115 is provided to a driveshaft 117, which is mechanically and operatively coupled to the rotor system 103 and the anti-torque system through a main rotor transmission 119 and a tail rotor transmission, respectively.

The rotorcraft 101 further includes a fuselage 125 and tail section 123. The tail section 123 may have other flight control devices such as horizontal or vertical stabilizers, rudder, elevators, or other control or stabilizing surfaces that are used to control or stabilize flight of the rotorcraft 101. The fuselage 125 includes a cockpit 127, which includes displays, controls, and instruments. It should be appreciated that even though rotorcraft 101 is depicted as having certain illustrated features, the rotorcraft 101 may have a variety of implementation-specific configurations. For instance, in some embodiments, cockpit 127 is configured to accommodate a pilot or a pilot and co-pilot, as illustrated. It is also contemplated, however, that rotorcraft 101 may be operated remotely, in which case cockpit 127 could be configured as a fully functioning cockpit to accommodate a pilot (and possibly a co-pilot as well) to provide for greater flexibility of use, or could be configured with a cockpit having limited functionality (e.g., a cockpit with accommodations for only one person who would function as the pilot operating perhaps with a remote co-pilot or who would function as a co-pilot or back-up pilot with the primary piloting functions being performed remotely. In yet other contemplated embodiments, rotorcraft 101 could be configured as an unmanned vehicle, in which case cockpit 127 could be eliminated entirely in order to save space and cost.

Figure 2:
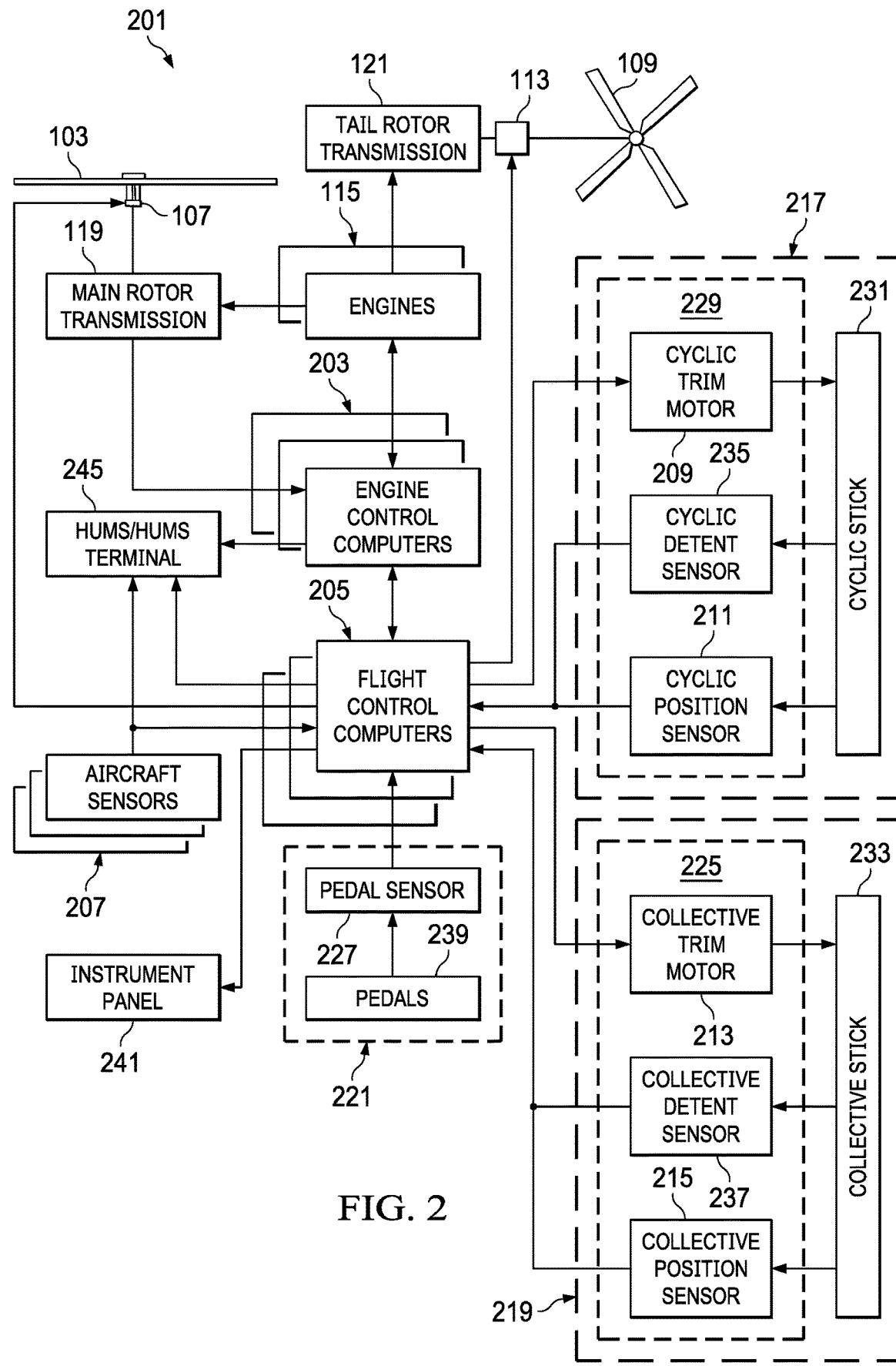
FIG. 2 illustrates a fly-by-wire flight control system for a rotorcraft according to some embodiments.

FIG. 2 illustrates a fly-by-wire flight control system 201 for a rotorcraft according to some embodiments. A pilot may manipulate one or more pilot flight controls in order to control flight of the rotorcraft. The pilot flight controls may include manual controls such as a cyclic stick 231 in a cyclic control assembly 217, a collective stick 233 in a collective control assembly 219, and pedals 239 in a pedal control assembly 221. Inputs provided by the pilot to the pilot flight controls may be transmitted mechanically and/or electronically (e.g., via the FBW flight control system) to flight control devices by the flight control system 201. Flight control devices may represent devices operable to change the flight characteristics of the rotorcraft. Flight control devices on the rotorcraft may include mechanical and/or electrical systems operable to change the positions or angle of attack of the main rotor blades 105 and the tail rotor blades in or to change the power output of the engines 115, as examples. Flight control devices include systems such as the swashplate 107, tail rotor actuator 113, and systems operable to control the engines 115. The flight control system 201 may adjust the flight control devices independently of the flight crew in order to stabilize the rotorcraft, reduce workload of the flight crew, and the like. The flight control system 201 includes engine control computers (ECCUs) 203, flight control computers (FCCs) 205, and aircraft sensors 207, which collectively adjust the flight control devices and monitors the rotorcraft during operation.

The flight control system 201 has one or more FCCs 205. In some embodiments, multiple FCCs 205 are provided for redundancy. One or more modules within the FCCs 205 may be partially or wholly embodied as software and/or hardware for performing any functionality described herein. In embodiments where the flight control system 201 is a FBW flight control system, the FCCs 205 may analyze pilot inputs and dispatch corresponding commands to the ECCUs 203, the tail rotor actuator 113, and/or actuators for the swashplate 107. Further, the FCCs 205 are configured and receive input commands from the pilot controls through sensors associated with each of the pilot flight controls. The input commands are received by measuring the positions of the pilot controls. The FCCs 205 also control tactile cues to the pilot controls or display information in instruments on, for example, an instrument panel 241.

The ECCUs 203 control the engines 115. For example, the ECCUs 203 may vary the output power of the engines 115 to control the rotational speed of the main rotor blades or the tail rotor blades. The ECCUs 203 may control the output power of the engines 115 according to commands from the FCCs 205, or may do so based on feedback such as measured revolutions per minute (RPM) of the main rotor blades.

The cyclic control assembly 217 is connected to a cyclic trim assembly 229 having one or more cyclic position sensors 211, one or more cyclic detent sensors 235, and one or more cyclic actuators or cyclic trim motors 209. The cyclic position sensors 211 measure the position of the cyclic stick 231. In some embodiments, the cyclic stick 231 is a single control stick that moves along two axes and permits a pilot to control pitch, which is the vertical angle of the nose of the rotorcraft and roll, which is the side-to-side angle of the rotorcraft. In some embodiments, the cyclic control assembly 217 has separate cyclic position sensors 211 that measuring roll and pitch separately. The cyclic position sensors 211 for detecting roll and pitch generate roll and pitch signals, respectively, (sometimes referred to as cyclic longitude and cyclic latitude signals, respectively) which are sent to the FCCs 205, which controls the swashplate 107, engines 115, tail rotor 109 or related flight control devices.

The cyclic trim motors 209 are connected to the FCCs 205, and receive signals from the FCCs 205 to move the cyclic stick 231. In some embodiments, the FCCs 205 determine a suggested cyclic stick position for the cyclic stick 231 according to one or more of the collective stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The suggested cyclic stick position is a position determined by the FCCs 205 to give a desired cyclic action. In some embodiments, the FCCs 205 send a suggested cyclic stick position signal indicating the suggested cyclic stick position to the cyclic trim motors 209. While the FCCs 205 may command the cyclic trim motors 209 to move the cyclic stick 231 to a particular position (which would in turn drive actuators associated with swashplate 107 accordingly), the cyclic position sensors 211 detect the actual position of the cyclic stick 231 that is set by the cyclic trim motors 206 or input by the pilot, allowing the pilot to override the suggested cyclic stick position. The cyclic trim motor 209 is connected to the cyclic stick 231 so that the pilot may move the cyclic stick 231 while the trim motor is driving the cyclic stick 231 to override the suggested cyclic stick position. Thus, in some embodiments, the FCCs 205 receive a signal from the cyclic position sensors 211 indicating the actual cyclic stick position, and do not rely on the suggested cyclic stick position to command the swashplate 107.

Similar to the cyclic control assembly 217, the collective control assembly 219 is connected to a collective trim assembly 225 having one or more collective position sensors 215, one or more collective detent sensors 237, and one or more collective actuators or collective trim motors 213. The collective position sensors 215 measure the position of a collective stick 233 in the collective control assembly 219. In some embodiments, the collective stick 233 is a single control stick that moves along a single axis or with a lever type action. A collective position sensor 215 detects the position of the collective stick 233 and sends a collective position signal to the FCCs 205, which controls engines 115, swashplate actuators, or related flight control devices according to the collective position signal to control the vertical movement of the rotorcraft. In some embodiments, the FCCs 205 may send a power command signal to the ECCUs 203 and a collective command signal to the main rotor or swashplate actuators so that the angle of attack of the main blades is raised or lowered collectively, and the engine power is set to provide the needed power to keep the main rotor RPM substantially constant.

The collective trim motor 213 is connected to the FCCs 205, and receives signals from the FCCs 205 to move the collective stick 233. Similar to the determination of the suggested cyclic stick position, in some embodiments, the FCCs 205 determine a suggested collective stick position for the collective stick 233 according to one or more of the cyclic stick position, the pedal position, the speed, altitude and attitude of the rotorcraft, the engine RPM, engine temperature, main rotor RPM, engine torque or other rotorcraft system conditions or flight conditions, or according to a predetermined function selected by the pilot. The FCCs 205 generate the suggested collective stick position and send a corresponding suggested collective stick signal to the collective trim motors 213 to move the collective stick 233 to a particular position. The collective position sensors 215 detect the actual position of the collective stick 233 that is set by the collective trim motor 213 or input by the pilot, allowing the pilot to override the suggested collective stick position.

The pedal control assembly 221 has one or more pedal sensors 227 that measure the position of pedals or other input elements in the pedal control assembly 221. In some embodiments, the pedal control assembly 221 is free of a trim motor or actuator, and may have a mechanical return element that centers the pedals when the pilot releases the pedals. In other embodiments, the pedal control assembly 221 has one or more trim motors that drive the pedal to a suggested pedal position according to a signal from the FCCs 205. The pedal sensor 227 detects the position of the pedals 239 and sends a pedal position signal to the FCCs 205, which controls the tail rotor 109 to cause the rotorcraft to yaw or rotate around a vertical axis.

The cyclic and collective trim motors 209 and 213 may drive the cyclic stick 231 and collective stick 233, respectively, to suggested positions. The cyclic and collective trim motors 209 and 213 may drive the cyclic stick 231 and collective stick 233, respectively, to suggested positions, but this movement capability may also be used to provide tactile cueing to a pilot. Additionally, the cyclic control assembly 217, collective control assembly 219 and/or pedal control assembly 221 may each have one or more detent sensors that determine whether the pilot is handling a particular control device. The FCCs 205 may provide different default control or automated commands to one or more flight systems based on the detent status of a particular stick or pilot control.

The aircraft sensors 207 may be in communication with the FCCs 205, a health and usage monitoring system (HUMS) 245. The aircraft sensors 207 may include sensors for monitoring operation of the rotorcraft, providing pilot data, providing operational data, or the like, and may include measuring a variety of rotorcraft systems, operating conditions, flight parameters, environmental conditions and the like. For example, the aircraft sensors 207 may include sensors for gathering flight data, and may include sensors for measuring airspeed, altitude, attitude, position, orientation, temperature, airspeed, vertical speed, and the like. The aircraft sensors 207 may include sensors relying upon data or signals originating external to the rotorcraft, such as a global positioning system (GPS) sensor, a very high frequency (VHF) omnidirectional range sensor, Instrument Landing System (ILS), and the like. The aircraft sensors 207 may also include sensors for reading operational data such as vibration, device rotational speed, electrical operating characteristics, fluid flows, or the like.

The flight control system 201 may further include the HUMS 245 or a HUMS terminal. In some embodiments, the HUMS collects data from flight system 201 elements for storage and later download, analysis, or the like. In some embodiments, the HUMS 245 may be connected to one or more aircraft sensors 207, FCCs 205, ECCUs 203, standalone sensors, sensors integrated into the HUMs, or other system components, or a combination of components. In some embodiments, the HUMS 245 may be separate from the FCCs 205, and may be implemented as a standalone system that communicates with, but that is operationally separate from, other elements of the flight control system 201. The HUMS 245 may be a terminal that stores raw data from one or more aircraft components, and provides the raw data to a server for interpretation and analysis. In other embodiments, the HUMS 245 may interpret raw data to determine one or more condition indicators for a server or other system that analyzes or displays the data. In yet another embodiment, the HUMS 245 may analyze the raw data or condition indicators to determine a trend or problem with a data set, and may display or indicate the interpreted data, a warning, a system status, or like, on the instrument panel 241, on a dedicated display, through an audible warning, within another display such as a flight director display, though a tactile feedback system, or the like. The HUMS 245 may use data from the aircraft sensor 207 to determine an operating condition such as vibration. For example, the HUMS 245 may use a combination of vibration data and rotational speed data to generate synchronous vibration data or other transformed data types, which may be analyzed for trends indicating developing problems with specific components associated with the vibration data.

Figure 3:
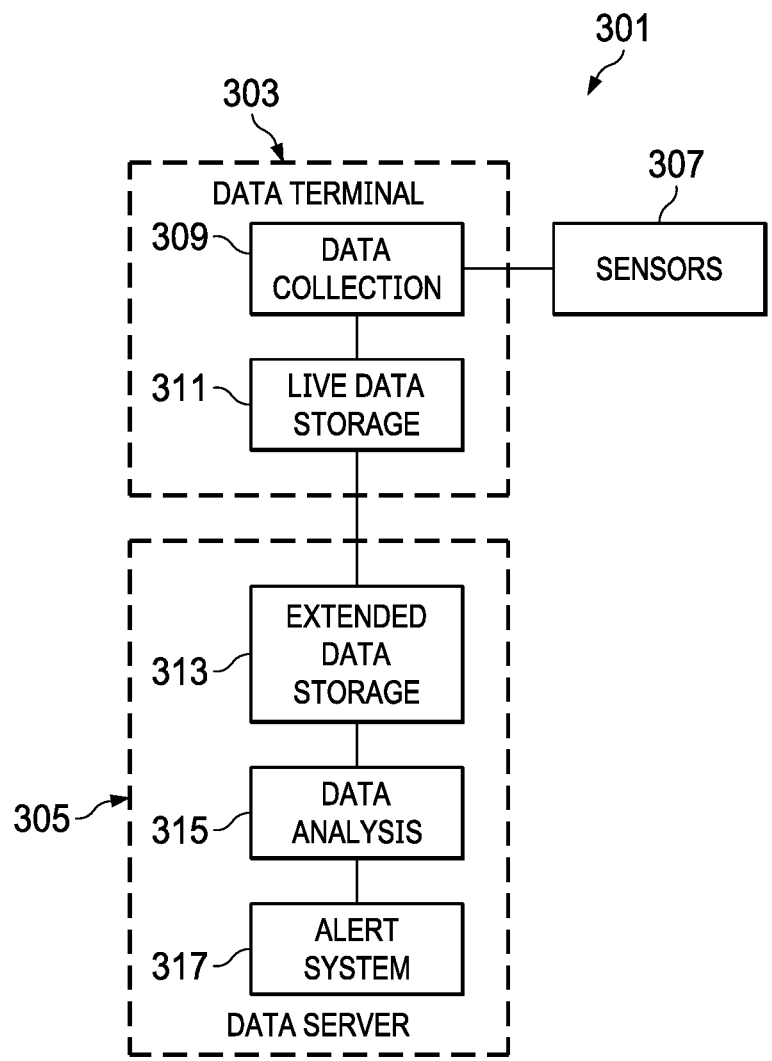
FIG. 3 is a block diagram illustrating a system for trend detection of component condition indicator data according to some embodiments.

FIG. 3 is a block diagram illustrating a HUMS 301 for trend detection of component condition indicator data according to some embodiments. The HUMS 301 may include a data terminal 303 that is connected to one or more sensors 307 and a data server 305. The sensors 307 may be aircraft sensors, as discussed above, and may take sensor readings and generate one or more sensor signals such as electrical signals, data elements, or the like, that indicate one or more operational conditions. For example, a sensor 307 may be a vibration sensor near an engine, gear set or transmission that detects vibrations from the local operating elements. In another example, the sensor 307 may be a voltage sensor or current detector that detects the voltage or current drawn by an electrical operating element such as a pump or a motor. In yet another example, the sensor 307 may be a pressure or flow sensor that detects the pressure of a hydraulic line or fuel line, the flow rate of a fluid such as fuel, coolant, oil hydraulic fluid, or the like.

The data terminal 303 may be a computer or other device that receives the sensor signals and stores the sensor signals locally for later analysis. In some embodiments, one or more of the HUMS terminal, the FCCs or ECCUs are data terminals 303. The data terminal 303 has a data collection element 309 that is a data handling element such as a processor, data collection circuit or device, or the like. In some embodiments, the data terminal 303 is a HUMS terminal that is a centralized device or standalone device that collects raw data from the sensors 307 and that generates condition indicator data from the raw data signals, or that collects condition indicator data from the sensors 307. In other embodiments, the data terminal 303 is a HUMS terminal that receives calculated or analyzed data such as alerts, trends, or the like from smart sensors 307 that determine condition indicators and perform analysis on the condition indicators. In yet another embodiment, the data terminal 303 may be, or include, a network of smart sensors 307 that act autonomously to collect data, and may determine condition indicators and perform some analysis of the condition indicator data. In such an embodiment, the smart sensors 307 may store the collected and calculated data or analysis for delivery directly to the data server 305. In some embodiments, the data collection element 309 also includes a communications circuit that receives the sensor signal from the sensors 307 and provides the raw sensor signal to the data collection element 309, which saves a condition indicator based on the raw sensor signal in live data storage 311.

In some embodiments, the data terminal 303 stores the sensor signal as the condition indicator in the live data storage 311, and in other embodiments, the data terminal 303 processes the raw sensor signal to generate a condition indicator based on, or according to, the raw sensor signal before storing the condition indicator. The data terminal 303 may actively query a sensor 307, may receive a signal from a sensor 307, or may sample a signal from a sensor 307 to acquire a raw data signal or sensor signal. The data terminal 303 may acquire the data signal at a particular time in a flight or in response to one or more operating conditions meeting a predetermined set of criteria. Thus, each condition indicator data set may be associated with an operating condition. The data terminal 303 may acquire a data signal, by sampling a continuous or live signal, or querying a sensor, when the data terminal 303 detects that flight conditions or operating conditions meet one or more criteria. For example, the data terminal 303 may be an FCC, and may determine that the engines are in a maximum takeoff power (MTOP) state based on the throttle and collective settings, and may acquire a data signal indicating, for example, vibrations of one or more components of an engine, transmission, gear train, or the like, or for fuel flow, power generation, transmission torque, or the like. In another example, the data terminal 303 may determine that the rotorcraft is in a hover, in forward flight, or in another flight state, and may acquire the data signal during the flight state. Condition indicator data sets may be formed from measurements or condition indicators determined in relation to similar operating conditions to provide consistent data. For example, a first condition indicator data set may include condition indicators for a main rotor transmission gear during MTOP across multiple flights, while a second condition indicator data set may include condition indicators for the same main rotor transmission gear during hover across multiple flights.

The data terminal 303 may store the data signal, a sample of the data signal, condition indicators, and other sensor data or relevant identifying information in the live data storage 311. In some embodiments, the data signal or condition indicator may be tagged with a date, time, and operating condition indicator information when stored in the live data storage 311 for later transmission to the data server 305.

The data server 305 aggregates data from one or more data terminals 303. The data server 305 collects data in one or more condition indicator data sets for aggregation and trend analysis, and may provide a report, alerts or other information related to detected trends for individual condition indicators data sets. The data server 305 stores condition indicators, trend information, and the like, in extended data storage 313. A data analysis element 315 reads condition indicator information and perform trend analysis or detection on the condition indicators, and saves trend information generated by the trend analysis into the extended data storage.

The data server 305 may be, for example, a server that is remote from the data terminal 303, or may be local to, or the same device as the data terminal. 303. In some embodiments, the data terminal 303 and data server 305 are both disposed in a vehicle such as a rotorcraft, and may both be implemented in one or more FCCs. In other embodiments, the data terminal 303 may be implemented in a device that is distinct from the device implementing the data server 305. For example, the data terminal 303 may be implemented in a dedicated monitoring computer or device using, for example, a purpose built processor, microcontroller, or the like, or may be implemented in an ECCU or other control computer, while the data server 305 is implemented in, for example, an FCC. In other embodiments, the data server 305 may be a diagnostic computer, remote server, or the like, that is separate from the vehicle on which the data terminal 303 is disposed. The data terminal 303 may transfer data to the data server 305 by responding to query from a maintenance computer, automatically transferring data to a remote data server 305 through a wireless connection, a manual transfer or download by a user using, for example, a non-transitory computer readable medium such as a universal serial bus (USB) stick or secure digital (SD) card, or the like.

The data terminal 303 collects a series of condition indicators for each operating condition that the data server 305 monitors. In some embodiments, the data server 305 receives raw sensor data or a data signal from the data terminal 303 or from the sensors 307 forming the data terminal 303, and performs analysis to isolate condition indicators from the data signal or raw sensor data. In other embodiments, the data terminal 303 performs the analysis and sends a processed data signal such as a condition indicator, data signal sample, or the like to the data server.

In some embodiments, the data signal may indicate more than one condition indicator, and processing the data signal may include isolating a condition indicator from the data signal. For example, the data terminal 303 may acquire a data signal from a vibration sensor adjacent to a main rotor transmission. The data signal may be a sample of the sensor data over a predetermined period of time, and may include data from multiple vibration sources. The data signal may be analyzed, by the data terminal 303 or the data server 305, by, for example, filtering using Fourier analysis or the like, to isolate signals for individual condition indicators. A Fourier transform may be applied to a data signal to transform the data signal into a filtered signal such as a frequency domain signal, which will indicate the amplitude of different subsignals making up the data signal. The subsignals at different frequencies may be associated with different condition indicators. For example, a first gear rotating at 300 RPM will correspond to a frequency signal at a first frequency in the filtered signal, while a second gear rotating at 2000 RPM will correspond to a frequency subsignal at a second frequency in the filtered signal. Thus, a first vibration condition indicator for the first gear will correspond to a first vibration subsignal having a frequency of about 5 Hz, while a second vibration condition indicator for the second gear will correspond to a second vibration subsignal having a frequency around 33.3 Hz. Thus, multiple condition indicators may be determined from a single data signal or a single sensor. In some embodiments, the sensors 307 may perform the processing of the data signals to determine the condition indicators, and may send, for example, a data packet or other data signal to data terminal 303. In other embodiments, the sensors 307 may send the data signal to the data collection element 309 of the data terminal 303, which processes the data signal to determine the condition indicators. In another embodiment, the sensors 307 may send the data signal to data terminal 303, which then passes the data signal to the data server 305 for determination of the condition indicators.

The data server 305 attempts to detect trends of condition indicators where the trend deviates from a normal or expected value. In some embodiments, the data server 305 has an alert system 317 that provides an alert indicating that a trend of a condition indicator has exceeded a particular threshold such as a static indicator threshold, static trend threshold or an adaptable trend threshold, a combination of the same, or the like. The alert system 317 may provide the alert to a vehicle operator, a maintenance technician, a fleet operator, a vehicle, owner, or to an automated system. The alert system 317 may be disposed in the vehicle, and include a cockpit indicator that is an audible indicator such as a buzzer or voice prompt provided through a flight director system, a graphic warning such as a note or other warning on a graphic screen, instrument screen, flight director screen, or the like, or may be provided as a dedicated visual indicator such as a dedicated a warning light, lamp, or the like. In other embodiments, the alert system 317 may be remote from the vehicle, and may provide an automated alert by generating a report with a list of conditions of concern, automatically messaging a technician or owner, providing an indicator on a monitoring system, or the like. For example, a data server 305 may be a monitoring server at a fleet operator, and, as each vehicle returns to the fleet base, the vehicle may automatically transmit condition indicator data to the data server by way of a wireless link, or through a maintenance computer connected to the vehicle by a technician. The data server 305 may aggregate the newly received condition indicator data for one or more monitored performance parameters with existing condition indicator or trend data for the relevant performance parameter, and analyze the data for trends. Upon detecting that a trend or condition data for a particular operating parameter has exceeded a particular threshold such as a static trend threshold or an adaptable trend threshold, the data server 305 may generate one or more alert signals, which may include generating a problem report indicating that a particular vehicle system, element or the like needs to be inspected, replaced, or otherwise addressed by a technician. The report may be generated in response to determining that the trend indicates a problem, or in response to query for the report. In other embodiments, the alert system 317 may generate an alert signal that automatically messages a fleet operator, vehicle owner, maintenance technician, or the like by email, short messaging system (SMS) message, text message, automated voice call, or the like. In other embodiments, the alert system 317 may generate the alert signal to display an indicator on a management web page, maintenance checklist, vehicle record, or the like. In some embodiments, the alert may indicate a severity of a problem, with the data server 305 comparing the trend data to multiple different thresholds. Thus, the alert may indicate the severity of a trend for a particular vehicle element. In some embodiments, a vehicle-born alert and a remote alert may be used in combination. For example, a maintenance or inspection alert may be generated for a transmission gear when trend data indicates that vibration of the gear has exceeded a threshold such as a static trend threshold or an adaptable trend threshold, indicating that the transmission gear should be inspected for possible damage. The alert system 317 may generate a warning or problem message such as automated remote message and/or an in-cockpit warning when the trend data exceeds a higher threshold, indicating that further use of the gear should be avoided. Thus, the alert system 317 may take different alert actions based on the comparison of the trend data to different thresholds.

The data server 305 may use data from one or more data collection points, such as sensors 307, data collection elements 309, data terminals 303, or like, to determine a trend for a particular condition indicator. In some embodiments, the data server 305 uses one or more EMAs for trend detection, with each EMA essentially acting as a one pole low-pass filter. The data server 305 may further use a difference in different EMAs in an MACD system for trend detection. Two EMAs applied to the data of interest can be used to determine the trend in the condition indicator. In some embodiments, the MACD system may use a first EMA or long term EMA with a long window ($EMA_{long}$) and second EMA or short term EMA with a short window ($EMA_{short}$), with the MACD being the difference between the two, for example, $EMA_{short}$-$EMA_{long}$. Positive MACD values indicate an upward trend in the data and negative values indicate downwards trends. A static trend threshold may be used to set an alert at a certain level, either positive, negative, or both.

Applying the MACD to the condition indicators permits the HUMS 301 to detect trends in the data rather than the absolute values of the data. A static indicator threshold is an absolute, constant, or fixed threshold that is compared to the condition indicator values. Thresholds used in conjunction with the MACD are trend thresholds that are compared to the trend data indicated by the MACD. In some embodiments, the trend threshold may be a static trend threshold that is constant or fixed, and that is compared to the MACD values. In other embodiments, the trend threshold may be an adaptable trend threshold that varies based, for example, on one or more values of the condition indicators, the MACD values, EMA values, or the like. The trend threshold permits detection of a condition indicator problem earlier than a static indicator threshold. This is because the trend threshold operates on the changes in the condition indicator values, rather than the values of the condition indicators themselves, as with a static indicator threshold. The trend threshold detects changes in the condition indicator well before a static indicator threshold. While a static indicator threshold may be lowered to detect potential problems in a condition indicator earlier, this may lead to false alarms for noisier signals. Thus, trend detection using a trend threshold tends to provide earlier detection, with fewer false alarms, than static indicator thresholds.

The use of the MACD with an adaptable trend threshold for trend detection in place of simple statistical indicators such as standard deviation, kurtosis, or the like, may avoid trends being over identified in non-trending noisy data signals, or under identified in trending, non-noisy, trending data signals. This is because such simple statistical indicators do not indicate a significant difference between a non-trending noisy data signal and a non-noisy data signals. However, the noise in a signal may be quantified as a measure of volatility. For example, taking the absolute value of the difference between adjacent points and the summing those values over a moving window provides more differentiation between noise and trend than does standard deviation or other simple statistical indicators. Additionally, this approach permits the adaptable trend threshold to adapt, or change, as the volatility in a condition indicator data set or signal changes, or to adapt to the volatility of different condition indicator data sets.

The volatility measure for a noisy signal will be greater than the volatility measure for a non-noisy signal, and is particularly useful when, for example, simple statistical indicators—such as standard deviation or kurtosis—indicate no difference or a small difference between the noisy and non-noisy signals. Therefore, the measure of volatility may be used for setting trend thresholds to determine trends. In some embodiments, the volatility measure V at time t is:

$$V(t) = \Sigma_{n=t-p}^{t} |X(n) - X(n-1)| \qquad (1)$$

Where V(t) is the volatility measure for a particular window, X is the value of the data being analyzed, such as the condition indicator data, at time t and (p+1) is the size of the window for the volatility measure. For example, if the window size is 150 samples, then p=149, since X(n-1) would take the calculation back to X(t-150). Additionally, in some embodiments, the volatility measure value V(t) can be divided by a scaling factor (S) to determine the adaptable trend threshold to be used for trend detection. Therefore, the adaptable trend threshold at time t is:

$$\text{Threshold}(t) = \frac{V(t)}{S} \qquad (2)$$

Where V(t) is as defined in Equation (1) and S is predetermined scaling factor. Nominally, this scaling factor S may of the same order as the window size (p+1) for the volatility measure V(t). Using the scaling factor S, where S has the same value as the window size (p+1), gives the average volatility over the window. Higher values of S would increase sensitivity, while lower values of S decrease sensitivity. In other embodiments, the scaling factor S may differ from the window size, and may be adjusted to tune the sensitivity of the trend detection.

In some embodiments, the scaling factor S may be a function of the value of data being analyzed, or a function of a fixed value. This permits for adjustment in sensitivity based on the absolute value of the data. Thus, a signal that is noisy, but whose peak values are still well below static indicator thresholds should not result in trend detection. For example, a adaptable trend threshold may be defined as:

$$\text{Threshold}(t) = \frac{V(t)}{S(X(t))} \qquad (3)$$

A trend is indicated when the MACD value exceeds the adaptable trend threshold. The trend is determined according to:

$$I(t) = \begin{cases} 0, & MACD(t) < \text{Threshold}(t) \\ 1, & MACD(t) \geq \text{Threshold}(t) \end{cases} \qquad (4)$$

Where I(t) is the trend indicator function, with a 1 for I(t) indicating a trend, an 0 for I(t) indicating no trend, and where MACD(t) is defined as:

$$MACD(t) = (EMA_A(t) - EMA_B(t)) \qquad (5)$$
$$= \left\{ \left( \frac{[(k_A - 1) \times EMA_A(t-1) + X(t)]}{k_A} \right) - \left( \frac{[(k_B - 1) \times EMA_B(t-1) + X(t)]}{k_B} \right) \right\}$$

In some embodiments, the EMAs are defined based on two different k values $k_A$, $k_B$. In some embodiments, the k values may be related, such as $k_A < k_B$ where $k_A \sim k_B/5$). In some embodiments, $k_A = 30$ and $k_B = 150$. Thus, the MACD uses a long term EMA ($k_B = 150$) and a short term EMA ($k_A = 30$). Additionally, the EMA is a single-pole low pass filter, however, other filters, including more complex filters, could also be used in other embodiments.

Figure 4A:
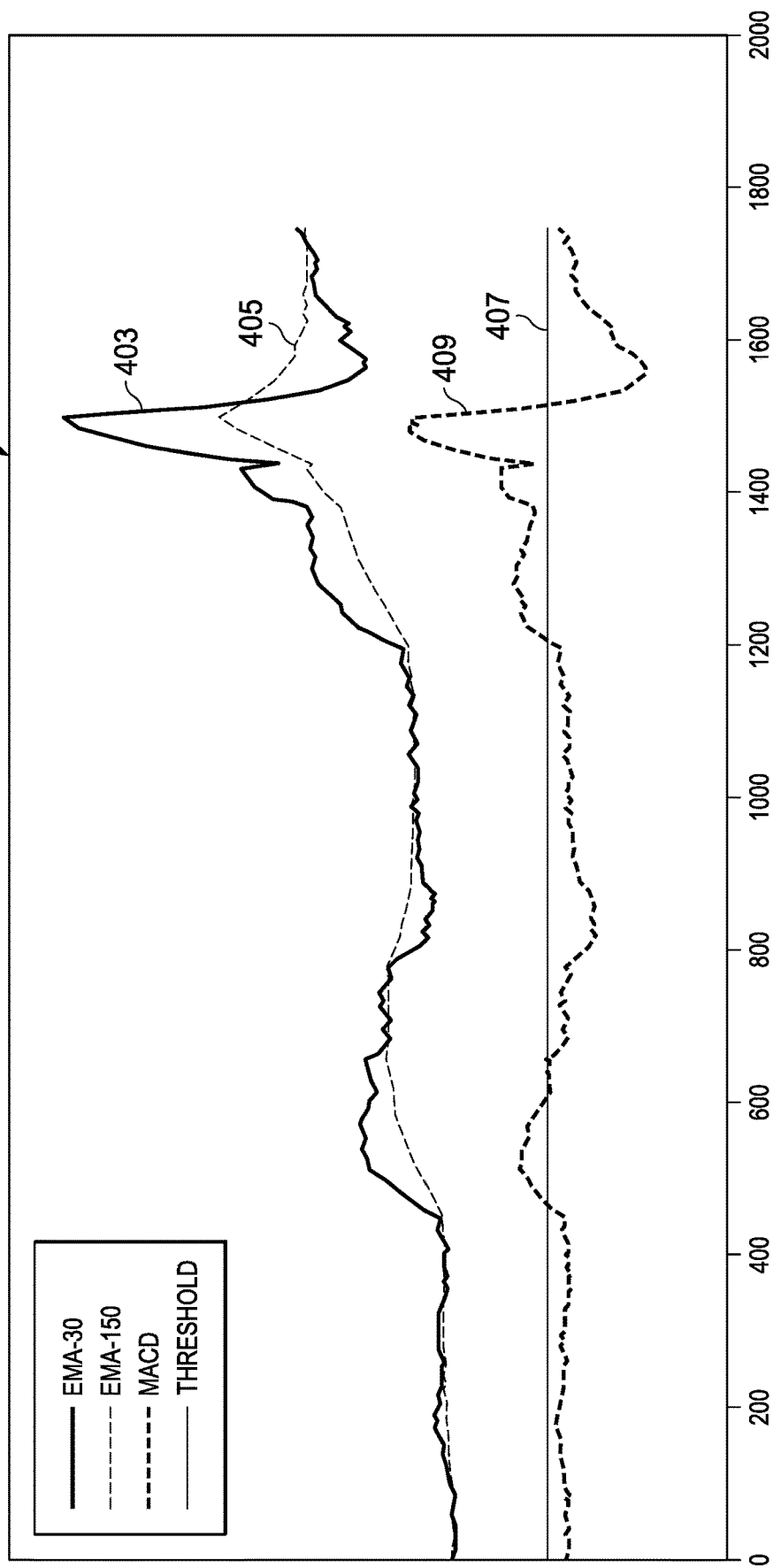
FIG. 4A is a graph illustrating the calculation of exponential moving average (EMA) values and moving average convergence divergence (MACD) values 409 according to an embodiment.
Figure 4B:
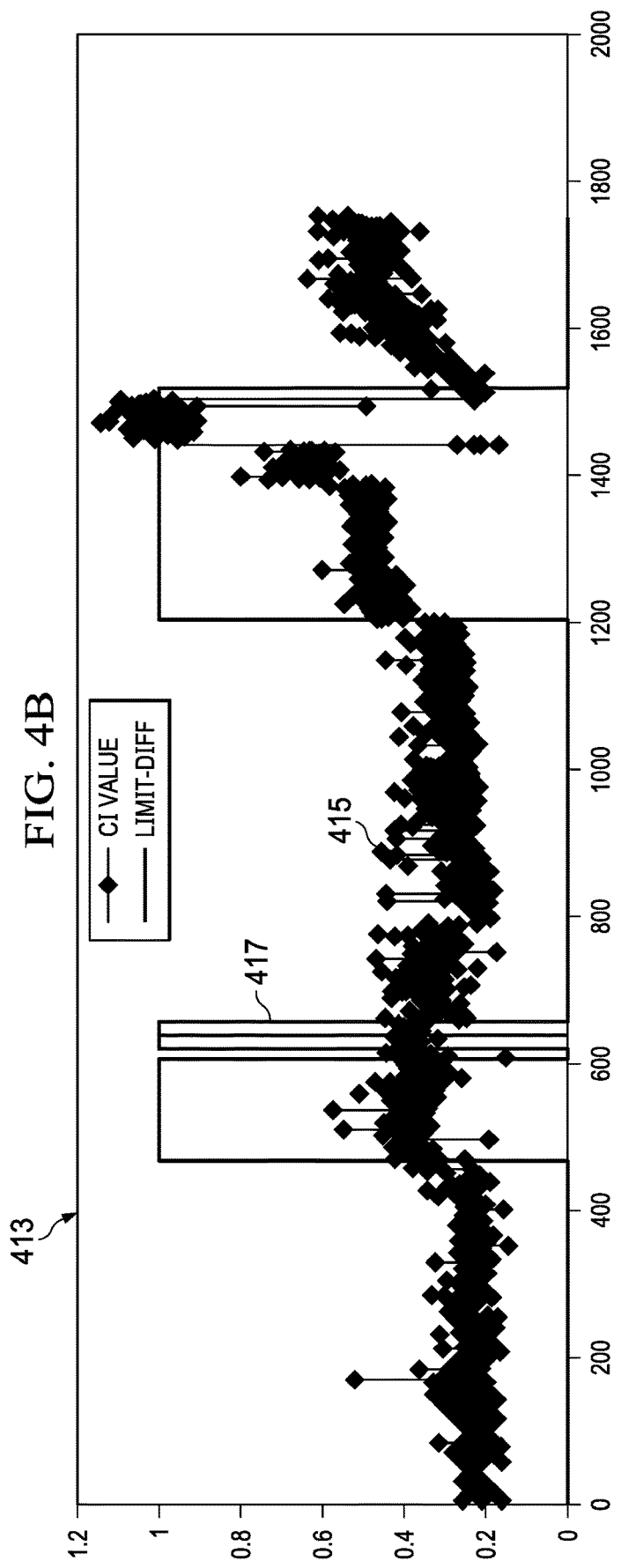
FIG. 4B is a graph illustrating condition indicator data 415 and a trend indication according to some embodiments.

FIG. 4A is a graph 401 illustrating the calculation of EMA values 403 and 405 and MACD values 409 according to some embodiments, and FIG. 4B is a graph 413 illustrating condition indicator data 415 and a trend indication 417 according to some embodiments. The EMA values 403 and 405 and MACD values 409 are generated using MACD analysis on the condition indicator data 415. Short term EMA values 403 are calculated with window value of 30, and long term EMA values 405 are calculated with window value of 150. The difference, as calculated according Equation 5, above, gives the MACD values 409, and in some embodiments, may be a difference calculation without additional filtering through another EMA. Additionally, in this example, a static trend threshold 407 of 1.2 is applied. The trend indication 417 is a comparison of the MACD value 409 to the static trend threshold 407, which may be performed according to Equation 4, above. The trend indication 417 shows that just a few periods of time would be flagged as trending.

FIG. 5A is a graph 501 illustrating a trend indication using the static trend threshold 407 with noisy condition indicator data 503 according to some embodiments. The condition indicator data 503 is noisier than the condition indicator data 415 of FIG. 4B. The noisier condition indicator data 503 has no discernable trend from visual inspection, compared to the condition indicator data 415. Applying the same static trend threshold 407 to the noisier condition indicator data 503 data yields a significant number of trending indications in the trend data 505.

Figure 5B:
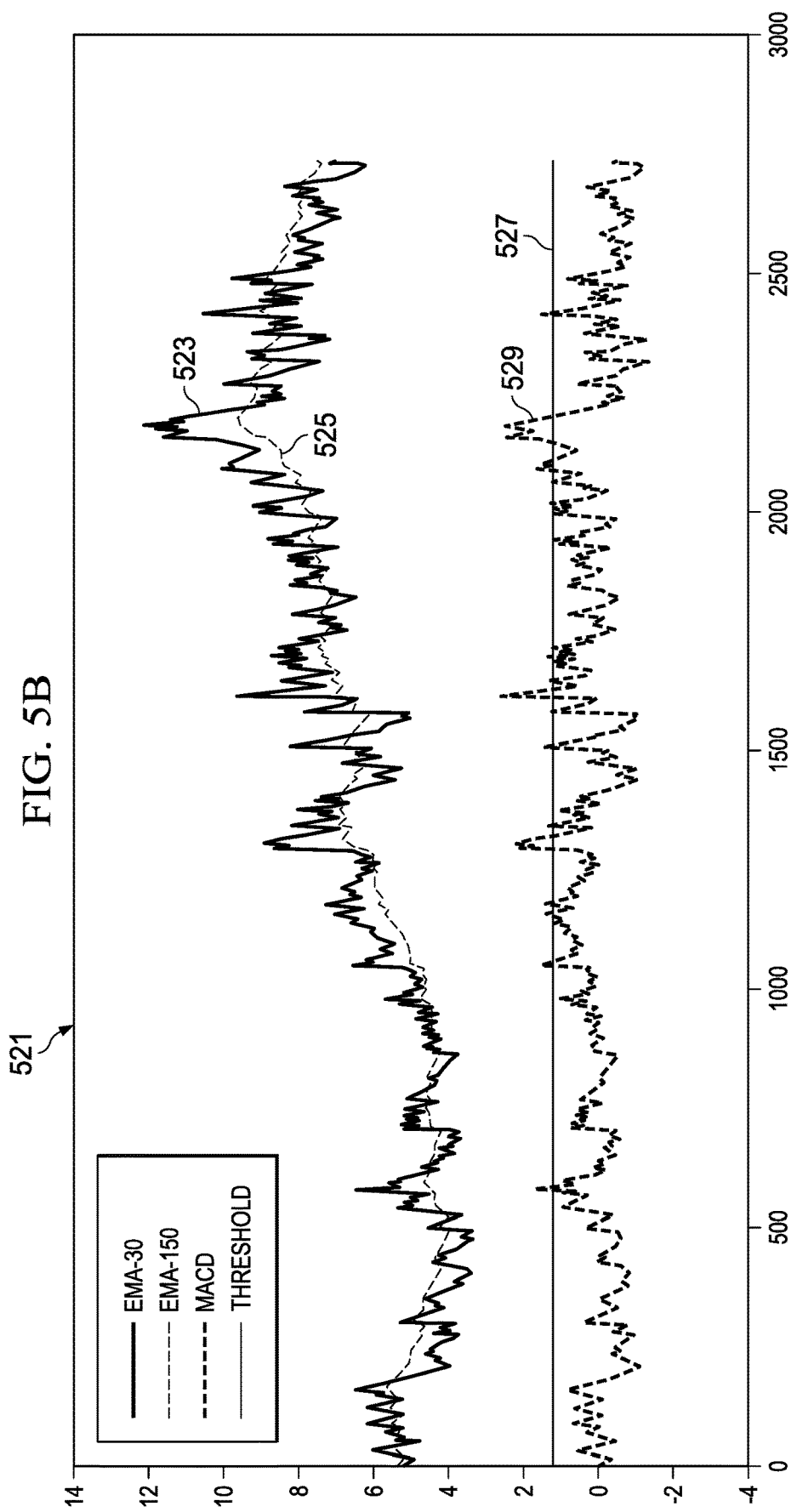
FIG. 5B is a chart illustrating the calculation of EMA values and MACD values in comparison to a static trend threshold according to some embodiments.

FIG. 5B is a chart 521 illustrating the calculation of EMA values 523 and 525 and MACD values 529 in comparison to a static trend threshold 527 according to some embodiments. The MACD values 529 are determined from the noisy condition indicator data 503 (FIG. 5A), compared against the static trend threshold 527, are used to determine the trend indication in FIG. 5A, and show that the value of 1.2 is "in the noise" of the MACD values 529. In some embodiments, the static trend threshold 527 may be, in this case, higher to account for this noise. In some embodiments, the data server 305 implements a different trend threshold for each condition indicator data set.

Figure 5C:
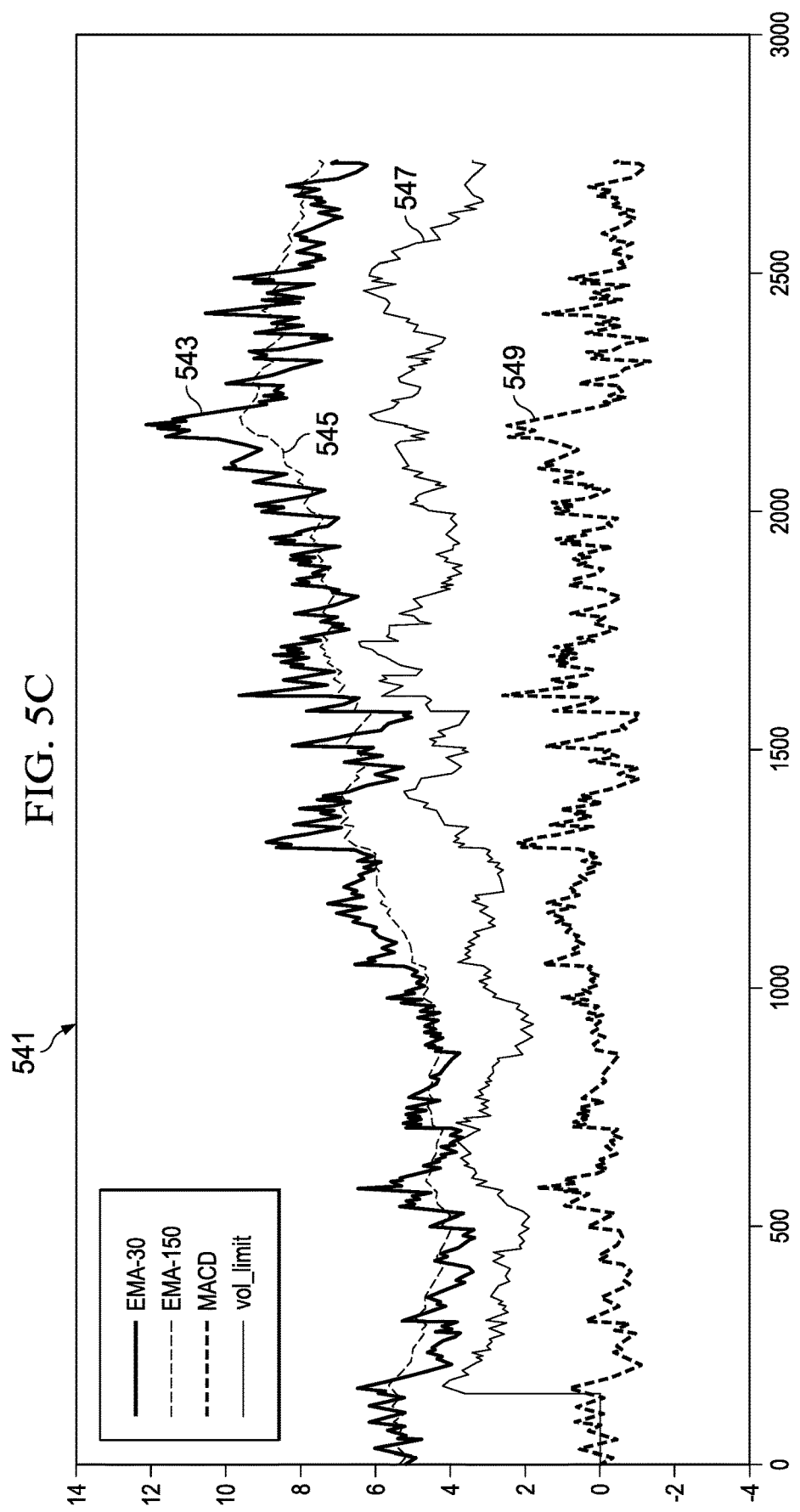
FIG. 5C is a chart illustrating the calculation of EMA values and MACD values in comparison to an adaptable trend threshold according to some embodiments.

FIG. 5C is a chart 541 illustrating the calculation of EMA values 543 and 545 and MACD values 549 in comparison to an adaptable trend threshold 547 according to some embodiments. For comparison purposes, the EMA values 543 and 545 and MACD values 549 in FIG. 5C are the same as the EMA values 523 and 525 and MACD values 529 in FIG. 5B. In some embodiments, the data server 305 implements a non-static trend threshold, and that trend threshold may be determined according to the volatility of the condition indicator data 503. The illustrated adaptable trend threshold 547 may be dynamically calculated according to a scaling factor, as shown in Equation 2, according to a scaling function and at least one previous condition indicator data value, as described in Equation 3, or according to another function. In some embodiments, the adaptable trend threshold 547 is determined according to a scaling factor S, where S is determined according to the size of a window for one of the EMAs 543 and 545. In some embodiments, the windows size for the larger EMA is used as the scaling factor S in Equation 2. For example, the larger EMA may use a window size of 150, or covering 150 data points. Thus, a scaling factor S of 150 may be used to normalize or average the volatility according to Equation 2 to dynamically determine the adaptable trend threshold 547. The adaptable trend threshold 547, as dynamically calculated from the condition indicator data 503 varies between 2 and 4 based on the changes in the volatility of the signal itself. This is in contrast to the static trend threshold 527 with a value of 1.2 in FIG. 5B. The values of the adaptable trend threshold 547 are higher than the MACD values 549, indicating that a trend does not exist.

Figure 5D:
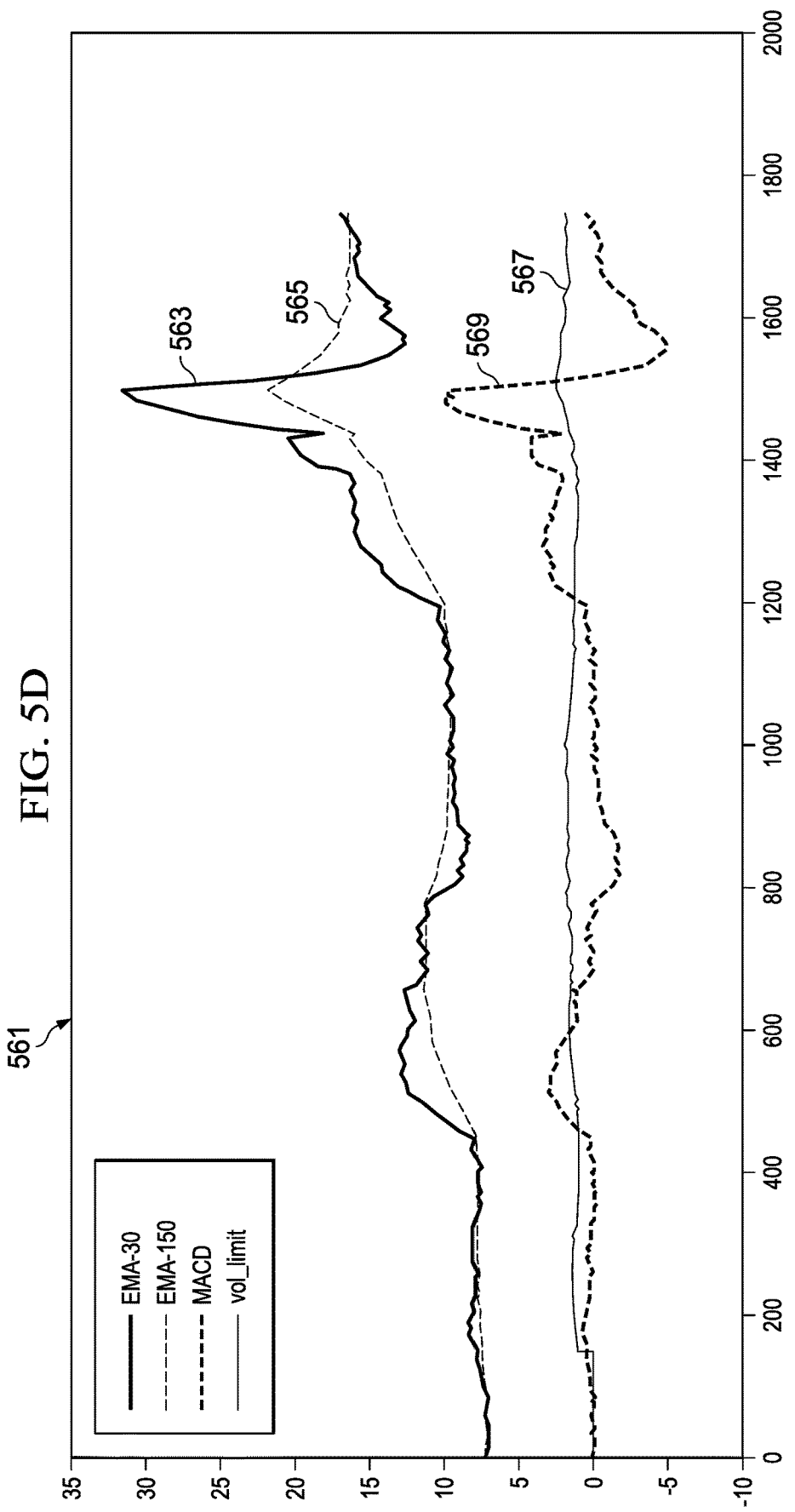
FIG. 5D is a chart illustrating the calculation of EMA values and MACD values in comparison to an adaptable trend threshold according to some embodiments.

FIG. 5D is a chart 561 illustrating the calculation of EMA values 563 and 565 and MACD values 569 in comparison to an adaptable trend threshold 567 according to some embodiments. For comparison purposes, the EMA values 563 and 565 and MACD values 569 are the same as the EMA values 403 and 405 and MACD values 409 of FIG. 4A, and FIG. 5A includes the adaptable trend threshold 567 instead of the static trend threshold 407 of 1.2 in FIG. 4A. The chart 561 illustrates the use of condition indicator data that is less noisy than that used for FIG. 5C, and illustrates that the adaptable trend threshold 567 does not impair the ability to detect a true trend. The same algorithm, namely the trend threshold algorithm of Equation 2 with a scaling factor S of 150, results in a fairly low adaptable trend threshold 567. This adaptable trend threshold 567 is lower than the adaptable trend threshold 547 of FIG. 5C, which used noisier data. Additionally, the calculating the adaptable trend threshold 567 using the volatility is, in some cases, lower than the 1.2 static trend threshold 407 and 527 of FIGS. 4A and 5B, respectively. Thus, the adaptable trend threshold provides a self-adjusting feature that permits the data terminal 303 to use the algorithm for the adaptable trend threshold with multiple, and different, condition indicator data sets without requiring the calculation of a customized fixed threshold for each condition indicator data set.

Figure 6A:
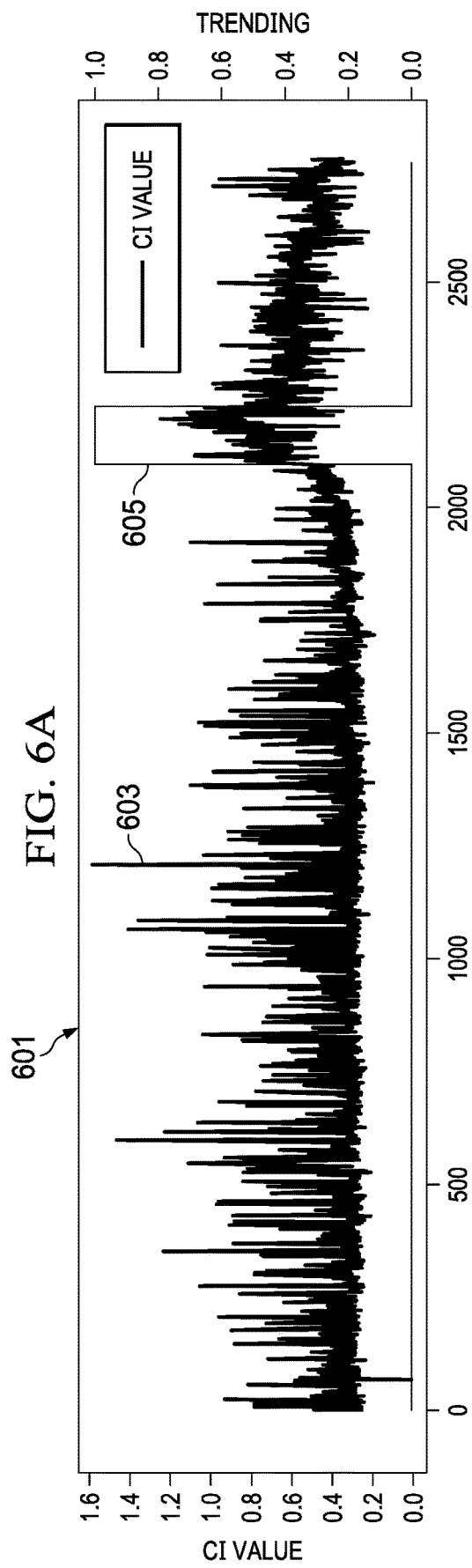
FIG. 6A is a graph illustrating condition indicator data and a trend indication according to some embodiments.
Figure 6B:
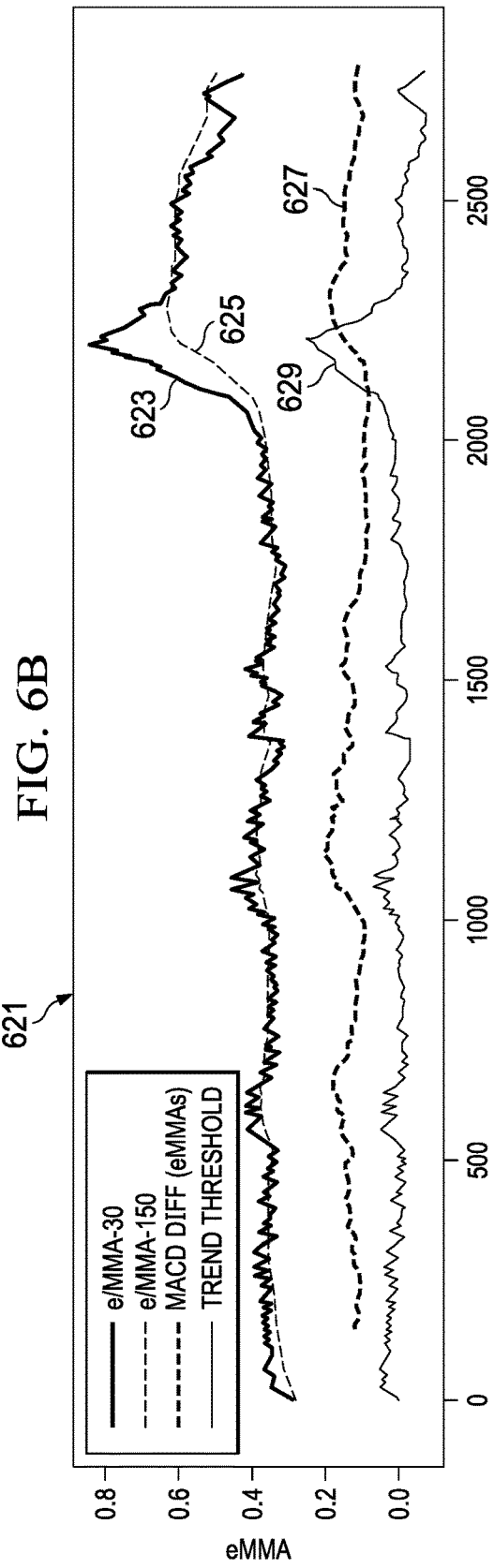
FIG. 6B is a graph illustrating the calculation of EMA values and adaptable trend threshold according to some embodiments.

FIG. 6A is a graph 601 illustrating condition indicator data 603 and a trend indication 605 according to some embodiments, and FIG. 6B is a graph 621 illustrating the calculation of EMA values 623 and 625 and adaptable trend threshold 627 according to some embodiments. The high value of the trend indication 605 series means that a trend is indicated. The adaptable trend threshold 627 and MACD values 629 lines indicate a single good detection (around 2100) where the MACD values 629 exceed the adaptable trend threshold 627. The trend indication 605 further illustrates a correlation between a rise in the EMAs 623 and 625 a rise in the condition indicator data 603. Thus, the adaptable trend threshold 627 is relatively insensitive to the noise that precedes the trend.

Figure 7A:
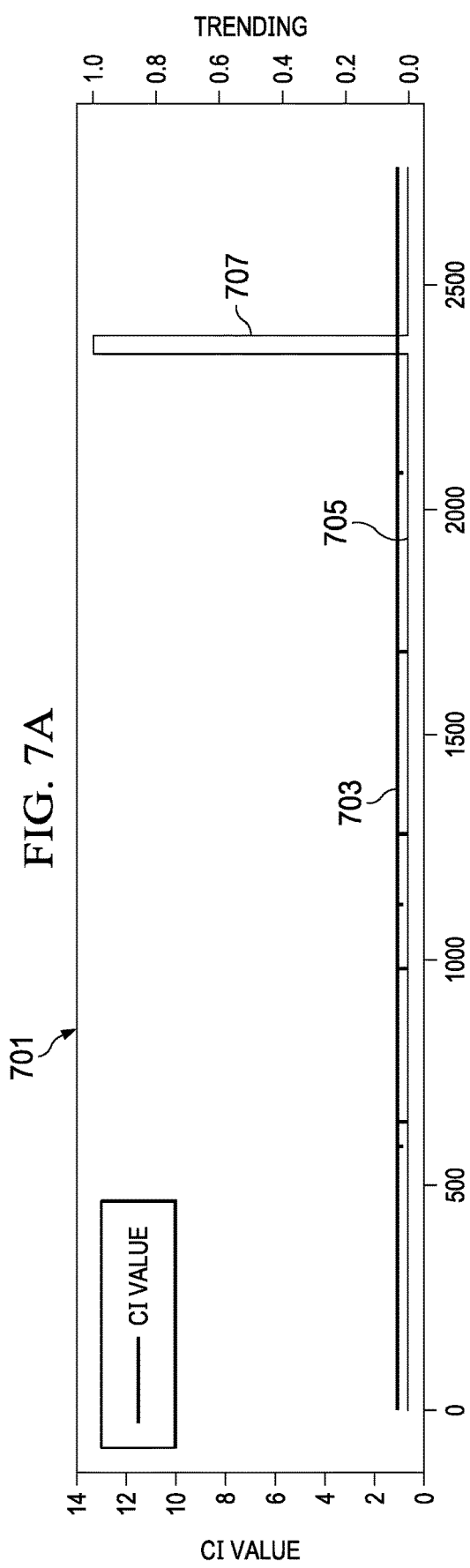
FIG. 7A is a graph illustrating condition indicator data and a trend indication according to some embodiments.
Figure 7B:
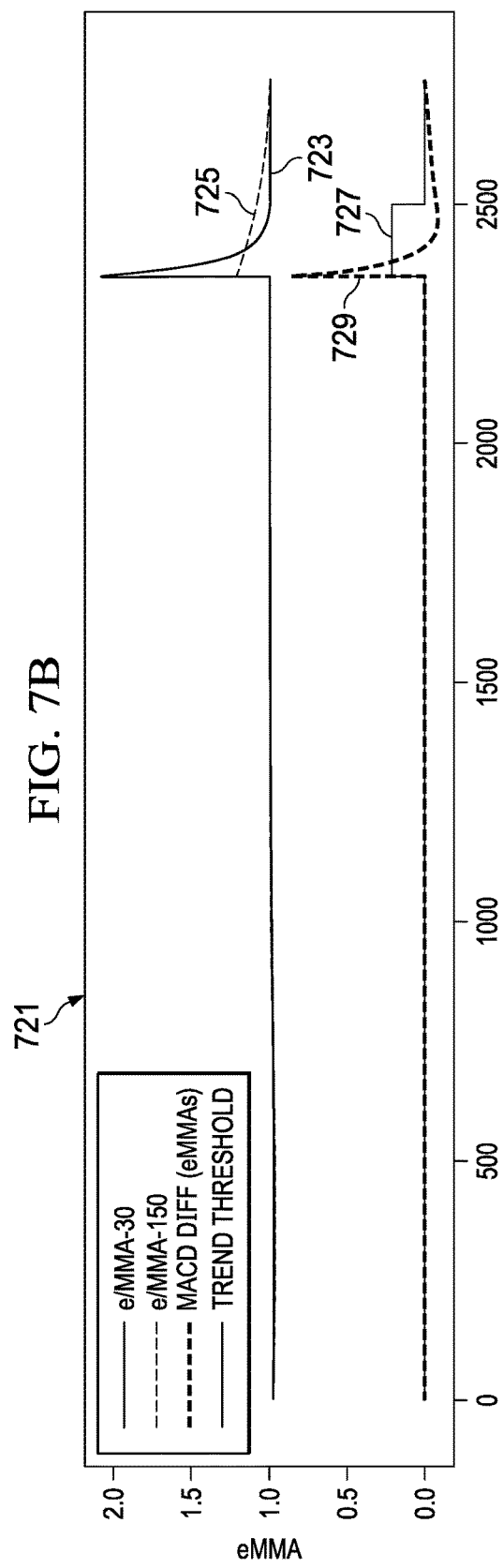
FIG. 7B is a graph illustrating the calculation of EMA values and adaptable trend threshold according to some embodiments.

FIG. 7A is a graph 701 illustrating condition indicator data 703 and a trend indication 705 according to some embodiments, and FIG. 7B is a graph 721 illustrating the calculation of EMA values 723 and 725 and adaptable trend threshold 727 according to some embodiments. The condition indicator data 703 includes a single value spike that results in the indicated trend 707 corresponding to the spike. High spikes in condition indicator data values may lead to transient trend detections when the spike is significantly greater than the remaining condition indicator data. For example, the single spike in the condition indicator data 703 causes a corresponding spike in the short term EMA 723 that significantly exceeds the value of the long term EMA 725, even though the long term EMA 725 also spikes. The significant difference in the EMAs 723 and 725 results in a significant spike in the MACD value 729, which exceeds the adaptable trend threshold 727 and results in a trend being indicated.

An improved low pass filter with, for example, more poles, may improve the ability to reject these spikes. In some embodiments, Butterworth or Chebyshev filters with different cut-off frequencies (to simulate the two windows in the EMA filters) may be used instead the EMAs. The different cut-off frequencies for the various filters may correspond to the different EMA windows. For example, the large term EMA 723 may correspond to a first cut-off frequency, and the short term EMA 723 may correspond to a second cut-off frequency that is higher than the first cut-off frequency. Additionally, other filters such as Kalman filters, Hodrick-Prescott, and the like, may alternatively be used singly, or in combination, to replace one or more the EMAs. For example, for the Hodrick-Prescott filter, the different cut-off frequencies correspond to different values of the multiplier lambda ($\lambda$), with a larger lambda used for a larger window EMA and a smaller lambda used for a smaller window EMA.

Lagging the MACD value by 1 (or more) samples versus the volatility or adaptable trend threshold permits the trend threshold to "learn" from that data while minimally delaying the indication of the trend. Thus, the MACD may be calculated using a calculation window that lags the calculation window used for calculating the trend threshold or the volatility by one or more samples or condition indicator values. This lag between the MACD calculation and the volatility or adaptable trend threshold avoids sensitivity to data spikes since the adaptable trend threshold includes the spike data before the MACD calculation includes the spike data. The volatility and trend threshold may be calculated from a condition indicator data set that includes the current condition indicator, while the MACD is calculated using a portion of the data set where each condition indicator is prior to the current condition indicator. This may be performed, in some embodiments, by using different or offset calculation windows for the volatility data used to calculate the adaptable trend threshold and the MACD. For example, the MACD may be offset from the volatility calculation by one data point, using data from condition indicators preceding the current condition indicator:

$$MACD(t) = (EMA_A(t) - EMA_B(t)) \quad (6)$$
$$= \left\{ \left( \frac{[(k_A - 1) \times EMA_A(t-2) + X(t-1)]}{k_A} \right) - \left( \frac{[(k_B - 1) \times EMA_B(t-2) + X(t-1)]}{k_B} \right) \right\}$$

In Equation 6, the MACD is calculated using $EMA_A(t-1)$ and $EMA_B(t-1)$, shifting the index to point the EMA calculation to a slightly different set of data by removing the most recent data point and adding an older data point. Offsetting the MACD calculation from the trend threshold calculation buffers the MACD calculation and smooths out the trend detection.

FIG. 8A is a graph 801 illustrating condition indicator data 803 and a trend indication 805 according to some embodiments. FIG. 8B is a graph 821 illustrating the calculation of EMA values 823 and 825 and adaptable trend threshold 827 according to some embodiments. In FIG. 8B, the MACD value 829 is determined in a period that is offset from determination of the adaptable trend threshold 827. In FIG. 8A, the condition indicator data 803 has spikes around 350, 750, and 800, which almost cause a trend indication, but the offset or lag of 1 data point between calculating the trend threshold and the MACD avoided the trend being indicated. However, the trend indication 805 indicates a trend around 1400, where the condition indicator data has a prolonged spike.

In some embodiments, having some hysteresis for turning the trend indication on or off prevents prevent dithering, where the trend indication rapidly switches between on and off. For example, having the trend indication come "on" at the calculated threshold level, but having the trend indication go "off" at a predetermined level associated with the adaptable trend threshold permits the data server 305 to smooth the trend indication. Thus, in an embodiment, a trend may be indicated when the MACD values are equal to, or exceed, the trend threshold, and may remain on until the MACD falls below, for example, 90% of the calculated trend threshold value. Therefore, the data server may determine that the trend is not indicated in response to the MACD value being less than a predetermined level of the trend threshold, may determine that the trend is indicated in response to the trend being indicated for a preceding condition indicator and the MACD value being equal to, or greater than, the predetermined level of the trend threshold.

In other embodiments, different levels of trend indication may be based on preset levels related to the adaptable trend threshold. For example, an alert system in the data server 305 may indicate a green light or OK state for a condition indicator when the MACD is below a first threshold level, such as 80% of the adaptable trend threshold. The alert system may indicate a yellow light or warning indicator when the MACD is between the first threshold level and a second, higher, threshold level, such as 100% of the adaptable trend threshold, and may indicate a red light or critical alert when the MACD is above the second threshold level.

Figure 8C:
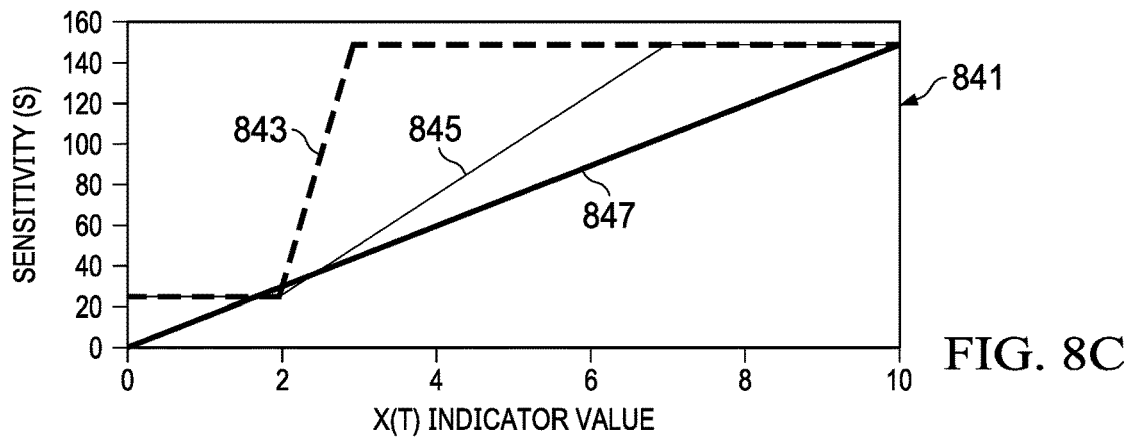
FIG. 8C is a graph illustrating a variety of scaling functions according to some embodiments.

FIG. 8C is a graph 841 illustrating a variety of scaling function according to some embodiments. In some embodiments, the adaptable trend threshold may be determined using a function for S in, for example, Equation 3. In some embodiments, scaling function S is a step function 843, a linear function 847, or a hybrid or combination of step and linear functions 845.

The sensitivity of the trend threshold calculation can itself be a function of the absolute value of a condition indicator data element as shown in Equation 3. In some embodiments, when the condition indicator data is close to a static indicator threshold, the data terminal is more sensitive to detecting a trend, but when the condition indicator data is far from the static indicator threshold, the data terminal is less sensitive to detecting a trend. Thus, trends which appear to be relatively significant, relative to the signal, but that are small relative to range of interest, or close to the static indicator threshold, could be ignored. In the simplest form, a minimum threshold that is a percentage of the static indicator threshold could be set.

In some embodiments, scaling function S(X(t)) is a step function 843 dependent on X(t), and may be used to adjust the sensitivity of the trend threshold as shown in Equation 3, so that the trend threshold is adjusted as X(t) increases. In some embodiments, the scaling function S(X(t)) could be a step function:

$$\left(S(X(t)) = \begin{cases} Y, & X(t) < A \\ Z, & X(t) \geq A \end{cases}\right. \tag{7}$$

Where Z>Y. In one embodiment, threshold A is based on the static indicator threshold for the data being analyzed, and in some embodiment S, may be, for example, 20% of the static indicator threshold. For the simple step function 843, as shown in FIG. 8c, a static indicator threshold of 10 may be of interest, and threshold A may be set to 2 based on the static indicator threshold. In such an example, an indicator value of 2 or lower may be of little concern, regardless of any trend indication. Therefore, the trend-based alert may take that into account by ignoring, or specially handling, trend alerts when the value of the condition indicator is below a lower static indicator threshold, or cut-off value.

In another embodiment, the scaling function S(X(t)) is a linear function 847:

$$(S(X(t)) = m*X(t) + b \tag{8}$$

Where m is a slope and b is an intercept. For the illustrated linear function 847, the intercept b=0 and slope m=15.

In another embodiment, the scaling function S(X(t)) could be a combination step and linear function 845, where values below a first trend threshold A have minimal, fixed, sensitivity, values between A and a second trend threshold B have increasing sensitivity according to a linear function, and values above B have a fixed sensitivity. For the step/linear combination function 845, the value of first trend threshold A is 2, the slope m=25, and the value the second trend threshold B=7. The combination step and linear function 845 has a fixed sensitivity below 2, a ramp up in sensitivity to 7, and then that fixed sensitivity above 7.

While only one linear function is illustrated shown, it should be understood that multiple linear functions may be combined into different zones. Additionally, the scaling function S(X(t)) is not limited to linear or step functions, but may be polynomial, parabolic, exponential, logarithmic, hyperbolic functions, or another nonlinear function, a combination of non-linear functions, or a combination of non-linear functions, linear and step functions.

Additionally, trend detection using the MACD may be combined with detection of trends using static indicator thresholds, or monitoring other long term trends. The MACD trend detection is well suited for detecting the large changes in the MACD, catching issues that are trending up fairly quickly. However, the MACD trend detection approach tends to under-identify trends that are rising relatively slowly. The slowly rising trends are more easily detectable using absolute trends, or static indicator thresholds. Therefore, in some embodiments, the MACD trend detection using a trend threshold may be combined with another trend detection process, such as comparison of indicator data to a static indicator threshold, comparison of the long term EMA or other EMA to a static indicator threshold, comparison of the rate of change of an EMA such as a long term EMA of the condition indicator data to a threshold. Therefore, a trend indication may be indicted when the MACD exceeds a static or adaptable trend threshold, or when an EMA indicates a long term trend exceeds another threshold such as a static indicator threshold or rate of change threshold. Similarly, the MACD trend detection approach may be combined with one or more statistical measures so that the process finds spikes or changes in statistical scatter in addition to identifying trends in the condition indicator data.

Figure 9A:
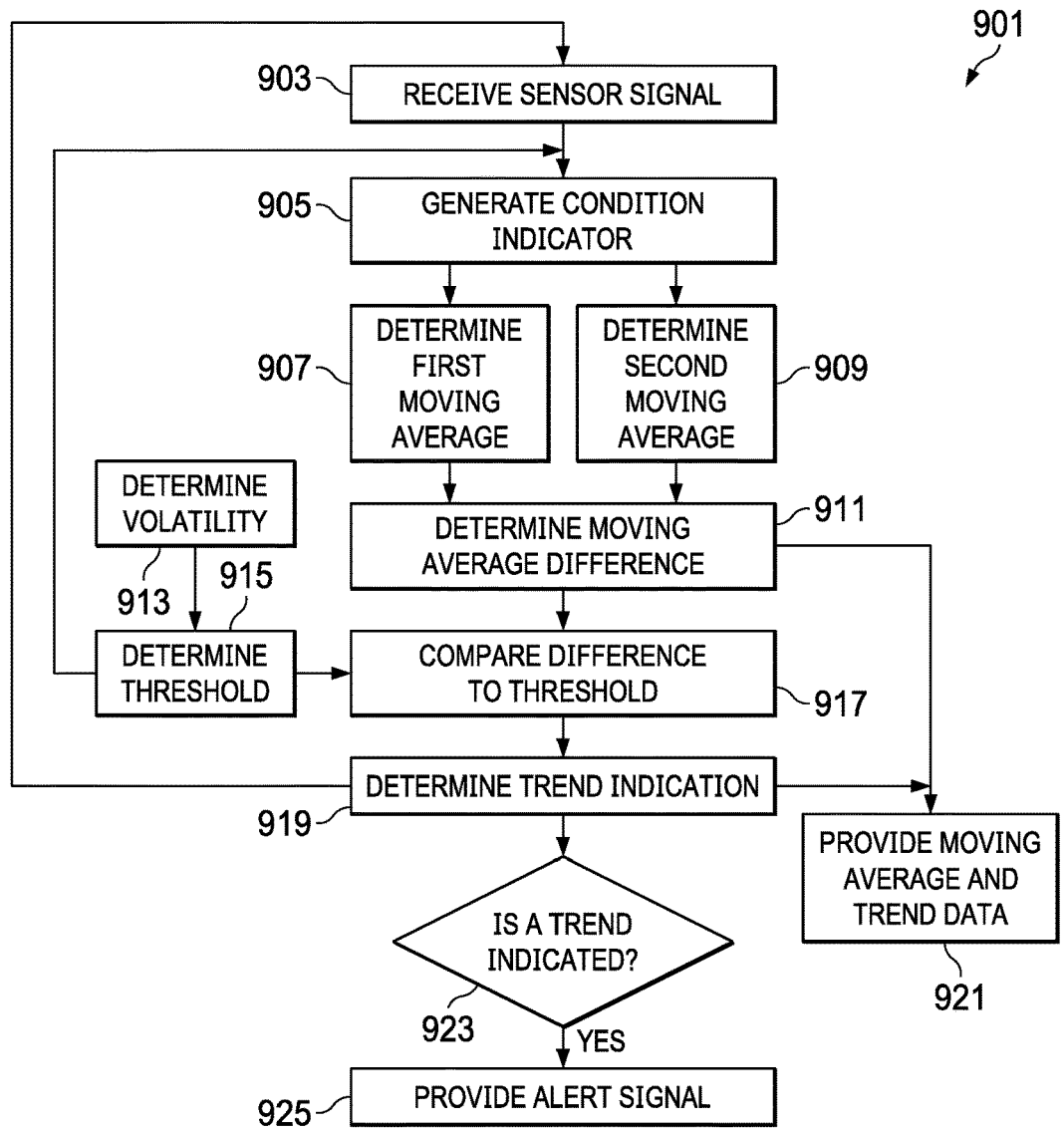
FIG. 9A is a flow diagram illustrating a method for providing an alert signal for condition indicator trends according to some embodiments.

FIG. 9A is a flow diagram illustrating a method 901 for providing an alert signal for condition indicator trends according to some embodiments. The method may be performed by a system having a data terminal and data server, and may be embodied in a software program stored on a non-transitory computer-readable storage medium that is executed by a processor of the data terminal and a processor of the data server.

In block 903, one or more sensor signals are received. In some embodiments, a sensor generates the sensor signal and provides the sensor signal to a data collection element in a data terminal. The sensor may continuously send the sensor signal for sampling by the data collection element, may send the sensor signal in response to a query, activation signal or the like, may send the sensor signal in response to a predetermined condition, may store the sensor signal for processing at the sensor device, or may send or provide the signal according to another procedure. A condition indicator is generated in block 905. In some embodiments, one or more condition indicators are generated from a sensor signal, with different condition indicators being derived from different subsignals in the sensor signal. In other embodiments, multiple readings from a sensor, or readings from multiple sensors may be combined or otherwise used to generate the condition indicator. For example, data signals form an accelerometer and from a tachometer may be used to generate synchronous time average vibration data or condition indicators. Additionally, the condition indicator may be generated at the sensor, at a data terminal or at a data server.

In block 907, a first moving average is determined, and in block 909 a second moving average is determined. In some embodiments, the first and second moving averages may each be EMAs, and in other embodiments, one or both of the moving averages are other types of filters. Additionally, the moving averages may be determined according to the condition indicator and a previously determined moving average or moving average covering a different portion of the condition indicator data set. In some embodiments, the moving averages have different window sizes, and the first moving average may have a first window size that is smaller than a window size of the second moving average. For example, the first moving average may have a window size that is about one fifth of the size of the window size for the second moving average, and is in some embodiments, 30 data points, while the window size for the second moving average is about 150 data points. In block 911, the difference in the moving averages is determined. In some embodiments, the difference, combined with differences in previously determined moving averages forms a series of MACD values.

In block 913, the volatility for the condition indicator is determined. In some embodiments, the volatility is a sum of changes in the condition indicators over a selected window. In block 915, a trend threshold for the condition indicator is determined, and may, in some embodiments, be an adaptable trend threshold. In some embodiments, the trend threshold may be an adaptable trend threshold that is offset from the last data used to determine the moving averages and moving average difference. In some embodiments, the threshold may be an adaptable trend threshold based on the volatility, may be adjusted using a scaling factor S or a scaling function $S(X(t))$, and may be determined by dividing the volatility by the scaling factor or scaling function. In some embodiments, the scaling function is a linear function, a stepped scaling function of a combination of linear and stepped functions.

In block 917, the difference in the moving averages is compared to the trend threshold, and in block 919 a trend indication is determined. In some embodiments, the trend is indicated based on the comparison of the moving average difference to the trend threshold, and in some embodiments, the trend indication uses hysteresis, where a trend is indicated when the trend initially exceeds the trend threshold, and the trend indication is maintained until the moving average difference falls below a hysteresis trend threshold that is lower than the trend threshold and is based on the trend threshold. In some embodiments, the moving average and trend data are provided in block 921. In some embodiments, the moving average and trend data may be provided through a data server as part of a chart, report, display or the like.

The collection of sensor data, determining of the threshold, moving average and moving average difference, comparison of the of the different to the threshold and determining the trend indication may be repeated any number of times and performed periodically or continuously. Thus, for example, after determining a trend indication in block 919, the system may receive a new sensor signal in block 903 and repeat the method 901, or, in another example, after determining the threshold in block 915, the system may generate a new condition indicator in block 905 from a newly received sensor signal and repeat the method 901.

In block 923, a determination is made on whether a trend is indicated, and if the trend is indicated, then an alert signal is provided in block 925. In some embodiments, the alert system or data server may activate an in-vehicle alert, for example, by lighting a trouble lamp in a vehicle cockpit, displaying a warning message on a cockpit display, or by providing an out-of-vehicle message by automatically message a fleet operator, vehicle owner, maintenance technician, or the like by email, short messaging system (SMS) message, text message, automated voice call, or the like. In some embodiments, the alert system may generate an alert and display an indicator on a management web page, maintenance checklist, vehicle record, or the like. In some embodiments, the alert signal is a problem report generated by a data server indicating a problem or warning for the system or element related to the condition indicators. Additionally, the alert system may indicate a level of problem or alert, for example, by providing an alert severity. In some embodiments, an in-vehicle alert and a remote alert may be used in combination.

Figure 9B:
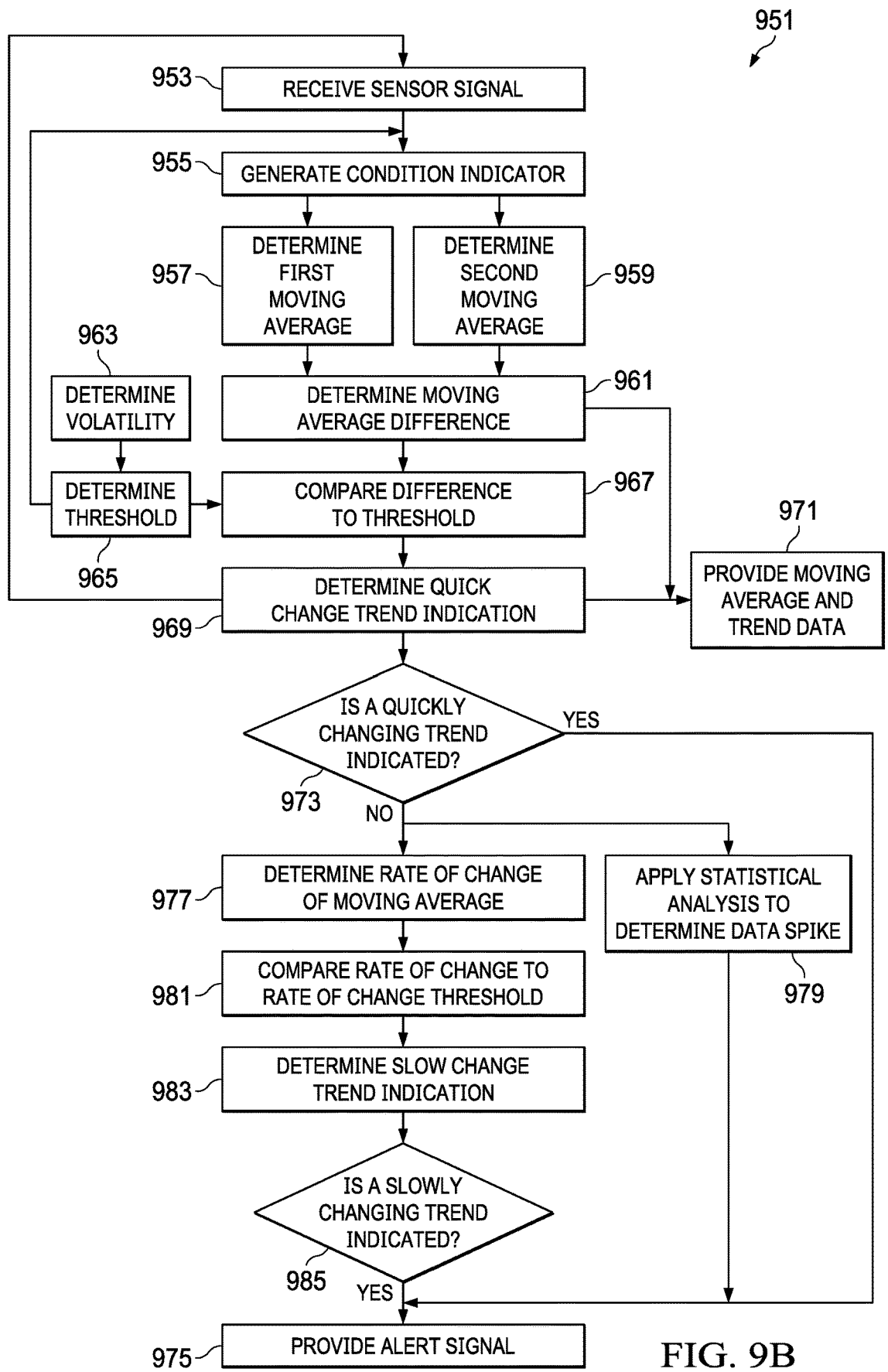
FIG. 9B is a flow diagram illustrating a method for providing an alert signal for quickly changing and slowly changing condition indicator trends according to some embodiments.

FIG. 9B is a flow diagram illustrating a method 951 for providing an alert signal for quickly changing and slowly changing condition indicator trends according to some embodiments. In such an embodiment, a system may use, for example, MACD analysis to determine whether a condition indicator indicated a quickly changing trend, and also determine whether a long term, or slowly changing, trend is indicated.

In the method 951 for providing an alert signal for quickly changing and slowing changing condition indicator trends, data collection and determination of the MACD is performed similarly to the method of FIG. 9A. In block 953, one or more sensor signals are received. A condition indicator is generated in block 955.

In block 957, a first moving average is determined, and in block 959 a second moving average is determined. In some embodiments, the first and second moving averages may each be EMAs, as discussed above. Additionally, the EMAs may include a short term EMA and a long term EMA. In other embodiments, one or both of the moving averages are other types of filters, with at least one of the moving averages being a long term moving average. In block 961, the difference in the moving averages is determined. In some embodiments, the difference, combined with differences in previously determined moving averages forms a series of MACD values. The MACD values may be used to determine whether a quickly changing trend is indicated by the condition indicator data.

In block 963, the volatility for the condition indicator is determined, and in block 965, a trend threshold for the condition indicator is determined. In some embodiments, the trend threshold is an adaptable trend threshold that may be based on the volatility. In block 967, the difference in the moving averages is compared to the trend threshold, and in block 969 a quickly changing trend indication is determined. In some embodiments, the quickly changing trend is indicated based on the comparison of the moving average difference or MACD to the trend threshold, and may be the same as described above with respect to FIG. 9A. In some embodiments, the moving average and trend data are provided in block 971 for display or later use.

In block 973, a determination is made on whether a quickly changing trend is indicated, and if the trend is indicated, then an alert signal is provided in block 975, and may be an alert similar to that of FIG. 9A. If, in block 973, a quickly changing trend is not indicated, the system may attempt to determine whether a slowly changing trend is indicated. The MACD analysis method may be used to catch quickly changing trends in the condition indicators, and a long term, data from, for example, a long term EMA or other long term moving average may be used to determine whether a long term or slowly changing trend is indicated.

In block 977, a Rate of change of a moving average is determined. In some embodiments, a derivative or other analysis is performed on, for example, the long term EMA that was calculated as part of the MACD calculation.

While the rate of change of the long term average may be used to determine slowly changing trends, the rate of change in trend condition indicator data tends to inaccurately detect quickly changing trends, as the rate of change tends to amplify noise in the existing signal, and result in many false alarms. Using the rate of change in combination with MACD analysis permits detection of slowly changing trends and quickly changing trend. The MACD analysis removes indicators of quickly changing trends from consideration, avoiding false alarms that would make use of the rate of change approach will be impractical. Performing the MACD analysis prior to the rate of change analysis identifies indicators with quickly changing trends, removing them from consideration before applying rate of change analysis that is limited to the long-term EMA of the remaining indicators to find slowly changing trends.

In block 981, the rate of change is compared to a rate of change threshold according to, for example:

$$ROC(EMA(150)) > Q \qquad (9)$$

For example, a rate of change threshold Q may be a static or adaptive threshold, and may be compared to the rate of change ROC of a long term EMA (EMA(150)) having, for example, a window size of 150 samples. In some embodiments, the rate of change threshold Q may be based on the value of the condition indicator.

In block 983, a slowly changing trend indication is determined. In some embodiments, the slowly changing trend indication may be based on the current value of the rate of change for the long term average or EMA exceeding the rate of change threshold Q. In other embodiments, the rate of change may be used to predict whether a trend will exceed a rate of change threshold or other threshold, within a predetermined time. Thus, the system may assume that a long term rate of change will continue at substantially the same rate of change, and project the time that would be needed for the long term average to exceed the threshold. In such an embodiment, a notification window may be used to determine whether a slowly changing trend is indicated by comparing the projected time needed to exceed the threshold falls within, or is less than, the notification window. For example, if, based on the rate of change and the current value of the indicator, a long term average may be projected to reach a static indicator threshold in 2 years. If the projected time to reach the static indicator threshold exceeds the notification window, the system may not provide an alert. However, if the current value of the indicator is higher (for the same rate of change) and the long term average would reach the static indicator threshold in projected time of 3 weeks, the projected time may be within, or less than, the notification window, and a slowly changing trend may be indicated.

In some embodiments, a first type of alert may be provided for a current slowly changing trend indication, and a different type of alert may be provided for a projected slowly changing trend indication. For example, a critical alert may be provided if the rate of change of a long term EMA exceeds a rate of change threshold, and a warning alert may be provided if the rate of change is below the rate of change threshold, but the value of the long term EMA is projected to exceed the static indicator threshold within a time period less than an indication window.

In block 985, a determination is made on whether the slowly changing trend is indicated, and if the slowly changing trend is indicated, then an alert signal is provided in block 975, and may be an alert similar to that discussed previously.

In block 979, one or more statistical analysis processes may be applied to determine whether a data spike has occurred in the relevant data. In some embodiments, the statistical analysis may be applied to the condition indicator data, to the MACD, to the rate of change of the long term EMA, or another data set or data point. In an embodiment, the system may, for example, compare the indicator value to a statistical threshold based on statistics of a moving window of the indicator such as standard deviation. For example, if a condition indicator value is above the statistical threshold, such as four (4) standard deviations, and a quickly changing trend is not indicated, then the indicator value may be identified as a data spike. Thus, identifying real, quickly changing trends before analysis of data using long term trend analysis or statistical spike analysis reduces the likelihood of missing quickly changing trends or falsely identifying data spikes as quickly changing trends. In some embodiments, a spike alert may be provided in block 975 if a spike is detected. The spike alert may be displayed to a user to alert the user to a potential catastrophic problem, such as a part failure, or to alert the user that the data spike may have caused a long term trend indication. Additionally, in some embodiments, if the statistical analysis indicates that a data spike has occurred in a data series, the system may ignore an associated long term trend indication, the data point may be discarded, further calculation of a long term moving average may be avoided, or another action may be taken.

Figure 10:
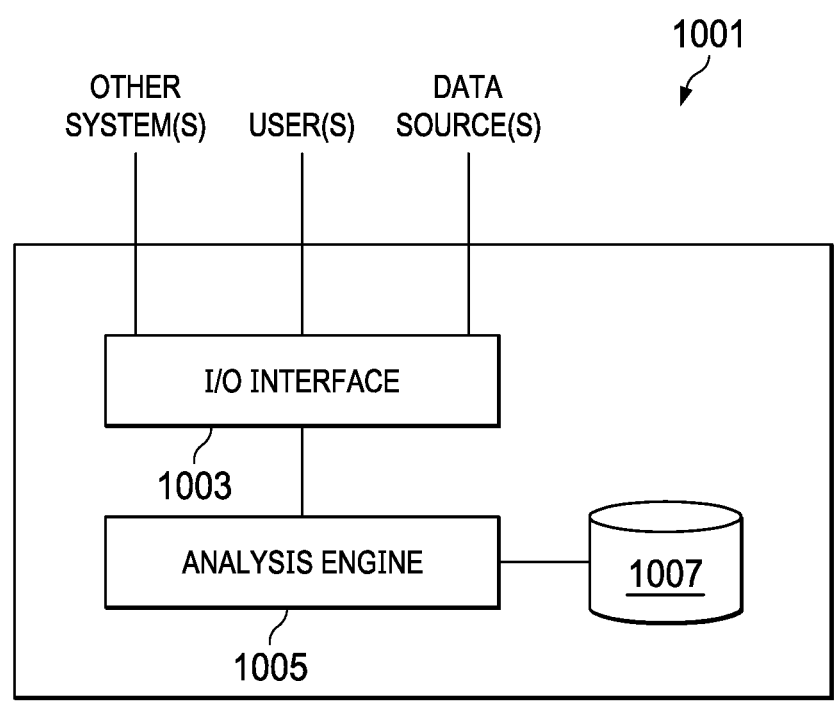
FIG. 10 is a diagram illustrating a computer system that may be used to implement a system, data terminal, or data server according to some embodiments.

FIG. 10 is a diagram illustrating a computer system 1001 that may be used to implement a system, data terminal, or data server according to some embodiments. The computer system 1001 can include an input/output (I/O) interface 1003, an analysis engine 1005, and a database 1007. Alternative embodiments can combine or distribute the I/O interface 1003, the analysis engine 1005, and the database 1007, as desired. Embodiments of the computer system 1001 may include one or more computers that include one or more processors and memories configured for performing tasks described herein. This can include, for example, a computer having a central processing unit (CPU) and non-volatile memory that stores software instructions for instructing the CPU to perform at least some of the tasks described herein. This can also include, for example, two or more computers that are in communication via a computer network, where one or more of the computers include a CPU and non-volatile memory, and one or more of the computer's non-volatile memory stores software instructions for instructing any of the CPU(s) to perform any of the tasks described herein. Thus, while the exemplary embodiment is described in terms of a discrete machine, it should be appreciated that this description is non-limiting, and that the present description applies equally to numerous other arrangements involving one or more machines performing tasks distributed in any way among the one or more machines. It should also be appreciated that such machines need not be dedicated to performing tasks described herein, but instead can be multi-purpose machines, for example computer workstations, that are suitable for also performing other tasks.

The I/O interface 1003 can provide a communication link between external users, systems, and data sources and components of the computer system 1001. The I/O interface 1003 can be configured for allowing one or more users to input information to the computer system 1001 via any known input device. Examples can include a keyboard, mouse, touch screen, and/or any other desired input device. The I/O interface 1003 can be configured for allowing one or more users to receive information output from the computer system 1001 via any known output device. Examples can include a display monitor, a printer, cockpit display, and/or any other desired output device. The I/O interface 1003 can be configured for allowing other systems to communicate with the computer system 1001. For example, the I/O interface 1003 can allow one or more remote computer(s) to access information, input information, and/or remotely instruct the computer system 1001 to perform one or more of the tasks described herein. The I/O interface 1003 can be configured for allowing communication with one or more remote data sources. For example, the I/O interface 1003 can allow one or more remote data source(s) to access information, input information, and/or remotely instruct the computer system 1001 to perform one or more of the tasks described herein.

The database 1007 provides persistent data storage for the computer system 1001. Although the term "database" is primarily used, a memory or other suitable data storage arrangement may provide the functionality of the database 1007. In alternative embodiments, the database 1007 can be integral to or separate from the computer system 1001 and can operate on one or more computers. The database 1007 preferably provides non-volatile data storage for any information suitable to support the operation of the flight control system 201 and the method 500, including various types of data discussed further herein. The analysis engine 1005 can include various combinations of one or more processors, memories, and software components.

An embodiment system includes a sensor operable to measure an operating condition of a vehicle and generate a sensor signal associated with the operating condition and a data server operable to acquire a current condition indicator of a condition indicator set according to the sensor signal, and to determine whether a trend in the condition indicator set is indicated according to at least the current condition indicator, at least one previous condition indicator of the condition indicator set and a volatility of at least a portion of the condition indicator set. The data server is further operable to provide an alert in response to determining that the trend is indicated.

In some embodiments, the system further includes a data terminal. The data terminal is operable to acquire the sensor signal from the sensor, and to store the sensor signal and send the stored sensor signal to the data server. In some embodiments, the data server is further operable to generate the current condition indicator from the sensor signal after receiving the sensor signal from the data terminal. In some embodiments, the operating condition of the vehicle is a vibration of the vehicle, and the current condition indicator is a vibration associated with an operating element of the vehicle determined according to a subsignal of the sensor signal or a feature of the sensor signal. In some embodiments, the data server is operable to determine whether the trend indicated according to the volatility of at least the portion of the condition indicator set and further according to a moving average convergence divergence (MACD) value determined from a first exponential moving average (EMA) of the condition indicator set, and a second (EMA) of the condition indicator set, and the first EMA has a first window size and the second EMA has a second window size smaller than the first window size. In some embodiments, the data server is operable to determine an adaptable trend threshold according to the volatility of at least a first portion of the condition indicator set, where the first portion of the condition indicator set includes the current condition indicator, and where the data server is further operable to determine that the trend in the condition indicator set is indicated in response to the MACD value being equal to, or greater than, the adaptable trend threshold. In some embodiments, the data server is further operable to determine the adaptable trend threshold according to the volatility of at least a first portion of the condition indicator set divided by one of a scaling factor or a scaling function. The scaling factor is equal to the first window size, the scaling function is one of a step function, a linear function or a combination of linear and step functions, and the scaling function is a function of the current condition indicator.

An embodiment data server includes a processor and a non-transitory computer-readable storage medium storing a program to be executed by the processor. The program including instructions for acquiring a current condition indicator of a condition indicator set associated with an operating condition of a vehicle, with the condition indicator set indicating sensor readings associated with an operating element of the vehicle under the operating condition, and determining a volatility of a first portion of the condition indicator set, where the first portion of the condition indicator set includes the current condition indicator. The program further includes instructions for determining one or more moving averages of a second portion of the condition indicator set, determining whether a trend associated with the operating element is indicated according to the one or more moving averages and the volatility, and generating an alert signal in response to the determining that the trend is indicated.

In some embodiments, the program further includes instructions for receiving a sensor signal having one of the sensor readings, separating a subsignal from the sensor signal, and determining the current condition indicator from the subsignal. In some embodiments, the instructions for the determining the one or more moving averages include instructions for determining a first exponential moving average (EMA) for a first window of the second portion of the condition indicator set, and determining a second EMA for a second window of the second portion of the condition indicator set, wherein the second window has a size smaller than a size of the first window. In some embodiments, the instructions for determining whether the trend is indicated include instructions for generating an MACD value according to the first EMA and the second EMA, and determining whether the trend is indicated according to the MACD value and the volatility. In some embodiments, the program further includes instructions for determining an adaptable trend threshold according to the volatility, and the instructions for determining whether the trend is indicated include instructions for determining that the trend is indicated in response to the MACD value being equal to, or exceeding, the adaptable trend threshold. In some embodiments, the instructions for determining the adaptable trend threshold include instructions for determining the adaptable trend threshold to be the volatility divided by a scaling factor associated with the size of the first window. In some embodiments, the instructions for determining whether the trend is indicated according to the MACD value and the volatility include instructions for determining whether a quickly changing trend is indicated, and the program further includes instructions for determining whether a slowly changing trend is indicated according to the first EMA and in response to determining that the quickly changing trend is not indicated, where the instructions for generating the alert signal include instructions for generating the alert signal in response to determining that the quickly changing trend is indicated or determining that the slowly changing trend is indicated. In some embodiments, the instructions for determining whether the trend is indicated include instructions for determining that the trend is not indicated in response to the MACD value being less than a predetermined level of the adaptable trend threshold, wherein the predetermined level of the adaptable trend threshold is less than a value of the adaptable trend threshold, and determining that the trend is indicated in response to the trend being indicated for a preceding condition indicator and the MACD value being equal to, or greater than, the predetermined level of the adaptable trend threshold. In some embodiments, each condition indicator in the second portion of the condition indicator set is prior to the current condition indicator, and one or more calculation windows for the one or more moving averages lag a calculation window for the volatility by at least one condition indicator.

An embodiment method includes acquiring a current condition indicator of a condition indicator set associated with an operating condition of a vehicle, with the condition indicator set indicating sensor readings associated with an operating element of the vehicle under the operating condition, determining, by a data server, a volatility of a first portion of the condition indicator set, where the first portion of the condition indicator set includes the current condition indicator, determining, by the data server, one or more moving averages of a second portion of the condition indicator set, determining, by the data server, whether a trend associated with the operating element is indicated according to the one or more moving averages and the volatility, and generating, by the data server, an alert signal in response to the determining that the trend is indicated.

In some embodiments, the determining the one or more moving averages includes determining a first exponential moving average (EMA) for a first window of the second portion of the condition indicator set, and determining a second EMA for a second window of the second portion of the condition indicator set, where the second window has a size smaller than a size of the first window, and the determining whether the trend is indicated includes generating an MACD value according to the first EMA and the second EMA, determining an adaptable trend threshold according to the volatility, and determining whether the trend is indicated in response to the MACD value being equal to, or exceeding, the adaptable trend threshold. In some embodiments, the adaptable trend threshold is the volatility divided by one of a scaling factor associated with the size of the first window or a result of a function applied to the current condition indicator, and the function is one of a step function, a linear function or a combination of linear and step functions. In some embodiments, the determining whether the trend is indicated further includes determining that the trend is not indicated in response to the MACD value being less than a predetermined level of the adaptable trend threshold, where the predetermined level of the adaptable trend threshold is less than a value of the adaptable trend threshold, and determining that the trend is indicated in response to the trend being indicated for a preceding condition indicator and the MACD value being equal to, or greater than, the predetermined level of the adaptable trend threshold. In some embodiments, each condition indicator in the second portion of the condition indicator set is prior to the current condition indicator, and one or more calculation windows for the one or more moving averages each lag a calculation window for the volatility by at least one condition indicator.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system, comprising:
    a sensor operable to measure an operating condition of a vehicle and generate a sensor signal associated with the operating condition; and
    a data server operable to acquire a current condition indicator of a condition indicator set according to the sensor signal, and to determine whether a trend in the condition indicator set is indicated according to at least the current condition indicator and at least one previous condition indicator of the condition indicator set and further according to a volatility of at least a portion of the condition indicator set and at least one moving average of at least a portion of the condition indicator set, wherein the data server is further operable to provide an alert in response to determining that the trend is indicated.

2. The system of claim 1, further comprising a data terminal, wherein the data terminal is operable to acquire the sensor signal from the sensor, and to store the sensor signal and send the stored sensor signal to the data server.

3. The system of claim 2, wherein the data server is further operable to generate the current condition indicator from the sensor signal after receiving the sensor signal from the data terminal.

4. The system of claim 1, wherein the operating condition of the vehicle is a vibration of the vehicle, and wherein the current condition indicator is a vibration associated with an operating element of the vehicle determined according to a subsignal of the sensor signal or a feature of the sensor signal.

5. The system of claim 1, wherein the at least one moving average of at least the portion of the condition indicator set comprises a moving average convergence divergence (MACD) value determined from a first exponential moving average (EMA) of the condition indicator set, and further comprises a second EMA of the condition indicator set, wherein the data server is operable to determine whether the trend is indicated according to the volatility of at least the portion of the condition indicator set and further according to a moving average convergence divergence (MACD) value determined from the first EMA and the second EMA, wherein the first EMA has a first window size and the second EMA has a second window size smaller than the first window size.

6. The system of claim 5, wherein the data server is operable to determine an adaptable trend threshold according to the volatility of at least a first portion of the condition indicator set, wherein the first portion of the condition indicator set includes the current condition indicator, and wherein the data server is further operable to determine that the trend in the condition indicator set is indicated in response to the MACD value being equal to, or greater than, the adaptable trend threshold.

7. The system of claim 6, wherein the data server is further operable to determine the adaptable trend threshold according to the volatility of at least a first portion of the condition indicator set divided by one of a scaling factor or a scaling function, wherein the scaling factor is equal to the first window size, wherein the scaling function is one of a step function, a linear function or a combination of linear and step functions, and wherein the scaling function is a function of the current condition indicator.

8. A data server, comprising:
  a processor; and
  a non-transitory computer-readable storage medium storing a program to be executed by the processor, the program including instructions for:
    acquiring a current condition indicator of a condition indicator set associated with an operating condition of a vehicle, the condition indicator set indicating sensor readings associated with an operating element of the vehicle under the operating condition;
    determining a volatility of a first portion of the condition indicator set, wherein the first portion of the condition indicator set includes the current condition indicator;
    determining one or more moving averages of a second portion of the condition indicator set;
    determining whether a trend associated with the operating element is indicated according to the one or more moving averages and the volatility; and
    generating an alert signal in response to the determining that the trend is indicated.

9. The data server of claim 8, wherein the program further includes instructions for:
    receiving a sensor signal having one of the sensor readings;
    separating a subsignal from the sensor signal; and
    determining the current condition indicator from the subsignal.

10. The data server of claim 8, wherein the instructions for the determining the one or more moving averages include instructions for:
    determining a first exponential moving average (EMA) for a first window of the second portion of the condition indicator set; and
    determining a second EMA for a second window of the second portion of the condition indicator set, wherein the second window has a size smaller than a size of the first window; and
    wherein the instructions for determining whether the trend is indicated include instructions for:
    generating an MACD value according to the first EMA and the second EMA; and
    determining whether the trend is indicated according to the MACD value and the volatility.

11. The data server of claim 10, wherein the program further includes instructions for determining an adaptable trend threshold according to the volatility; and
    wherein the instructions for determining whether the trend is indicated include instructions for determining that the trend is indicated in response to the MACD value being equal to, or exceeding, the adaptable trend threshold.

12. The data server of claim 11, wherein the instructions for determining the adaptable trend threshold include instructions for determining the adaptable trend threshold to be the volatility divided by a scaling factor associated with the size of the first window.

13. The data server of claim 10, wherein the instructions for determining whether the trend is indicated according to the MACD value and the volatility include instructions for determining whether a quickly changing trend is indicated;
    wherein the program further includes instructions for determining whether a slowly changing trend is indicated according to the first EMA and in response to determining that the quickly changing trend is not indicated; and
    wherein the instructions for generating the alert signal include instructions for generating the alert signal in response to determining that the quickly changing trend is indicated or determining that the slowly changing trend is indicated.

14. The data server of claim 11, wherein the instructions for determining whether the trend is indicated include instructions for:
    determining that the trend is not indicated in response to the MACD value being less than a predetermined level of the adaptable trend threshold, wherein the predetermined level of the adaptable trend threshold is less than a value of the adaptable trend threshold; and
    determining that the trend is indicated in response to the trend being indicated for a preceding condition indicator and the MACD value being equal to, or greater than, the predetermined level of the adaptable trend threshold.

15. The data server of claim 8, wherein each condition indicator in the second portion of the condition indicator set is prior to the current condition indicator; and
    wherein one or more calculation windows for the one or more moving averages lag a calculation window for the volatility by at least one condition indicator.

16. A method, comprising:
acquiring a current condition indicator of a condition indicator set associated with an operating condition of a vehicle, the condition indicator set indicating sensor readings associated with an operating element of the vehicle under the operating condition;
determining, by a data server, a volatility of a first portion of the condition indicator set, wherein the first portion of the condition indicator set includes the current condition indicator;
determining, by the data server, one or more moving averages of a second portion of the condition indicator set;
determining, by the data server, whether a trend associated with the operating element is indicated according to the one or more moving averages and the volatility; and
generating, by the data server, an alert signal in response to the determining that the trend is indicated.

17. The method of claim 16, wherein the determining the one or more moving averages comprises:
determining a first exponential moving average (EMA) for a first window of the second portion of the condition indicator set; and
determining a second EMA for a second window of the second portion of the condition indicator set, wherein the second window has a size smaller than a size of the first window; and
wherein the determining whether the trend is indicated includes:
generating an MACD value according to the first EMA and the second EMA;
determining an adaptable trend threshold according to the volatility; and
determining whether the trend is indicated in response to the MACD value being equal to, or exceeding, the adaptable trend threshold.

18. The method of claim 17, wherein the adaptable trend threshold is the volatility divided by one of a scaling factor associated with the size of the first window or a result of a function applied to the current condition indicator, and wherein the function is one of a step function, a linear function or a combination of linear and step functions.

19. The method of claim 17, wherein the determining whether the trend is indicated further comprises:
determining that the trend is not indicated in response to the MACD value being less than a predetermined level of the adaptable trend threshold, wherein the predetermined level of the adaptable trend threshold is less than a value of the adaptable trend threshold; and
determining that the trend is indicated in response to the trend being indicated for a preceding condition indicator and the MACD value being equal to, or greater than, the predetermined level of the adaptable trend threshold.

20. The method of claim 16, wherein each condition indicator in the second portion of the condition indicator set is prior to the current condition indicator; and
wherein one or more calculation windows for the one or more moving averages each lag a calculation window for the volatility by at least one condition indicator.

* * * * *